(12) United States Patent
Chen et al.

(10) Patent No.: US 12,488,649 B2
(45) Date of Patent: Dec. 2, 2025

(54) SHEET HANDLING APPARATUS AND SHEET HANDLING METHOD

(71) Applicant: Glory Ltd., Himeji (JP)

(72) Inventors: Yang Chen, Hygo (JP); Kazuhiro Doi, Hygo (JP); Satoru Kobayashi, Hygo (JP)

(73) Assignee: GLORY LTD., Himeji (JP)

( * ) Notice: Subject to any disclaimer, the term of this patent is extended or adjusted under 35 U.S.C. 154(b) by 900 days.

(21) Appl. No.: 17/233,547

(22) Filed: Apr. 19, 2021

(65) Prior Publication Data
US 2021/0327197 A1  Oct. 21, 2021

(30) Foreign Application Priority Data

Apr. 20, 2020 (JP) ................. 2020-074712

(51) Int. Cl.
*G07D 11/30* (2019.01)
*B65H 43/04* (2006.01)
(Continued)

(52) U.S. Cl.
CPC ............ *G07D 11/30* (2019.01); *B65H 43/04* (2013.01); *G07D 11/16* (2019.01); *G07D 11/23* (2019.01); *G07D 11/25* (2019.01); *G07D 11/28* (2019.01); *G07D 11/34* (2019.01); *G07D 11/36* (2019.01); *G07D 2211/00* (2013.01)

(58) Field of Classification Search
CPC .... G07D 11/23; G07D 11/16; G07D 2211/00; G07D 11/34; G07D 11/25; B65H 43/04
See application file for complete search history.

(56) References Cited

U.S. PATENT DOCUMENTS 9,141,876 B1 *  9/2015  Jones .............. G07D 11/30
10,909,794 B2 *  2/2021  Nada .............. G07D 11/235
(Continued)

FOREIGN PATENT DOCUMENTS

DE  102009035028 A1 *  2/2011  .......... G07D 1/00
EP  2284807 A1  2/2011
(Continued)

OTHER PUBLICATIONS

English Translation of DE 102009035028 A1 (Year: 2011).*
(Continued)

*Primary Examiner* — Jeffrey A Shapiro
(74) *Attorney, Agent, or Firm* — XSENSUS LLP

(57) ABSTRACT

A sheet handling apparatus comprises a transport path for transporting sheets, each sheet including individually assigned identification information; a storage that receives and stores the sheets; a feeder that feeds out the sheets stored in the storage to the transport path; and control circuitry configured to: store the identification information of the sheets in a memory; control the feeder to feed out, from the storage, one or more of the sheets in a case that necessity of checking an inventory amount of the sheets in the storage arises; control transport of the one or more sheets to the recognition circuitry and out of the discharge port; and determine an abnormality in the inventory amount of the sheets in the storage based on a comparison of the identification information of each of the one or more sheets with the identification information stored in the memory.

13 Claims, 8 Drawing Sheets

(51) Int. Cl.
*G07D 11/16* (2019.01)
*G07D 11/23* (2019.01)
*G07D 11/25* (2019.01)
*G07D 11/28* (2019.01)
*G07D 11/34* (2019.01)
*G07D 11/36* (2019.01)

(56) References Cited

U.S. PATENT DOCUMENTS

| | | | |
|---|---|---|---|
| 2013/0001039 A1 | 1/2013 | Mizushima et al. | |
| 2013/0001040 A1 | 1/2013 | Iwamura et al. | |
| 2014/0144750 A1* | 5/2014 | Shimizu | G07D 11/16 194/206 |
| 2016/0253635 A1* | 9/2016 | Marquardt | G06Q 30/0185 705/39 |
| 2016/0379433 A1* | 12/2016 | Lavigne | G07D 11/50 271/3.14 |
| 2017/0337764 A1* | 11/2017 | Yokawa | G07D 11/26 |
| 2018/0247480 A1* | 8/2018 | Numata | G07D 9/00 |
| 2021/0327199 A1* | 10/2021 | Hunt | G07F 19/207 |

FOREIGN PATENT DOCUMENTS

| | | |
|---|---|---|
| JP | 2013-012127 A | 1/2013 |
| JP | 5759289 B2 | 8/2015 |

OTHER PUBLICATIONS

Extended European search report issued on Sep. 17, 2021, in corresponding European patent Application No. 21167962.6, 7 pages.

Office Action issued on Nov. 21, 2023, in corresponding Japanese patent Application No. 2020-074712, 4 pages.

* cited by examiner (A1) SPECIFY SHEETS TO BE CHECK TARGETS
(A2) FEED OUT AND CHECK SHEETS SET AS CHECK TARGETS
(A3) TRANSPORT SHEETS SET AS CHECK TARGETS TO DISCHARGE UNIT

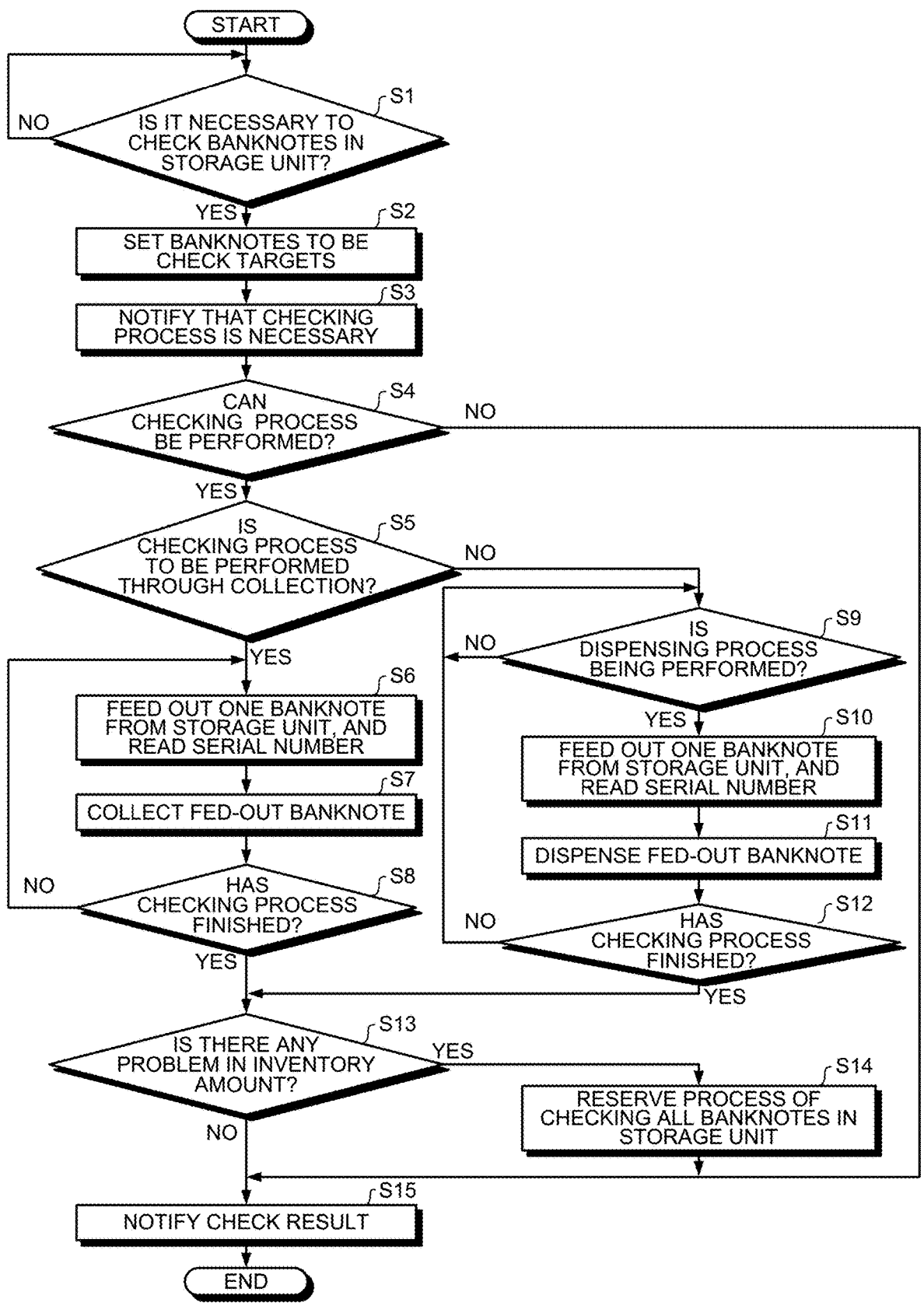

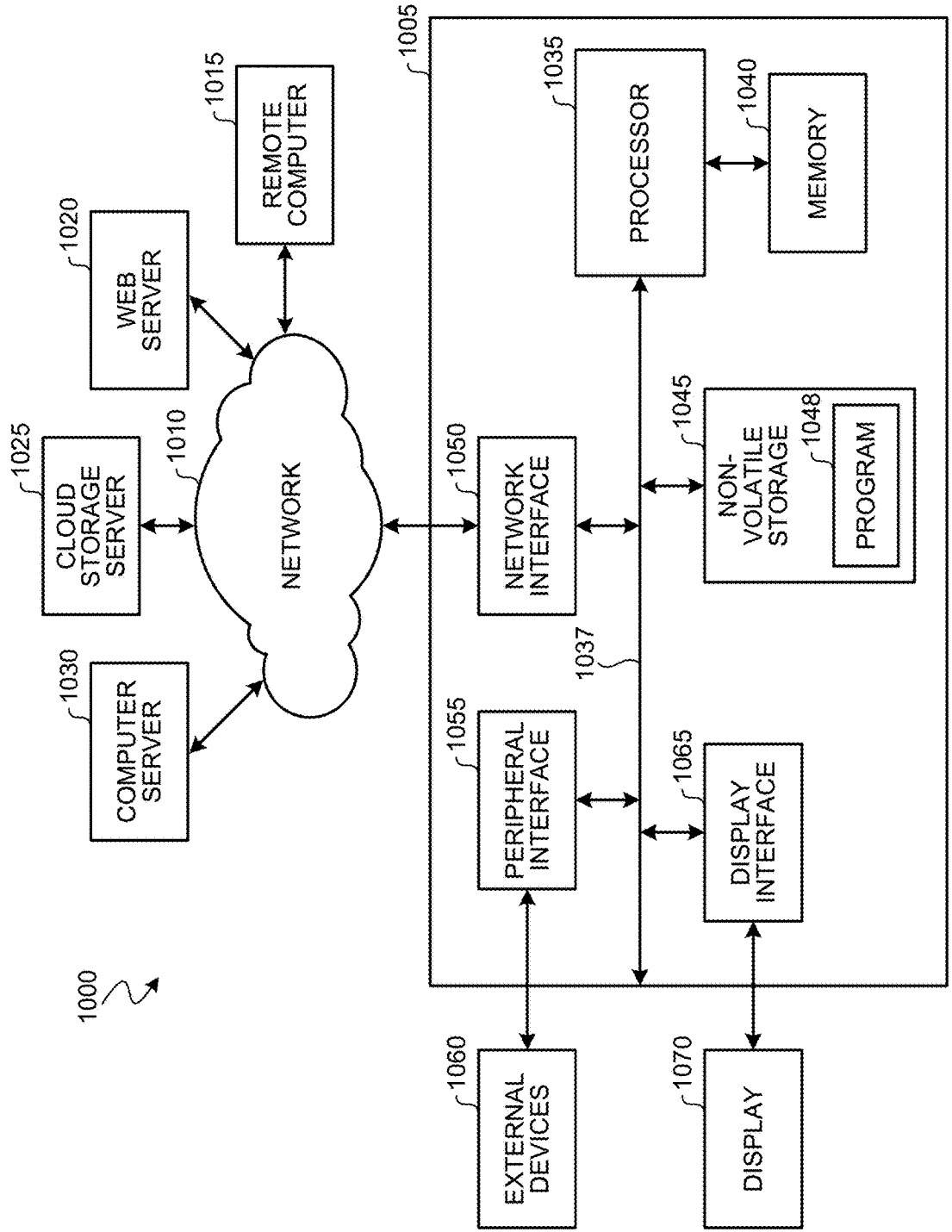

SHEET HANDLING APPARATUS AND SHEET HANDLING METHOD

CROSS-REFERENCE TO RELATED APPLICATION

The present application is based on and claims priority to Japanese Patent Application No. 2020-074712 filed on Apr. 20, 2020. The entire disclosure of the above-identified application, including the specification, drawings and claims is incorporated herein by reference and its entirety.

TECHNICAL FIELD

The present disclosure relates to a sheet handling apparatus and a sheet handling method for handling sheets.

BACKGROUND ART

Conventionally, various types of sheet handling apparatuses for handling sheets have been used. For example, a conventional banknote handling apparatus recognizes banknotes and reads the serial numbers of the banknotes during a depositing process, and thereafter stores the banknotes for each denomination into a plurality of storage units in the apparatus. During a dispensing process, the banknotes in the storage units are fed out therefrom and discharged from the apparatus. The banknote handling apparatus manages inventory information of each storage unit. The inventory information includes denominations, the number of banknotes for each denomination, and the serial numbers of the banknotes stored in the storage unit. The serial numbers of the banknotes are associated with the storage order of the banknotes in the storage unit, so that the serial numbers of the banknotes can be identified when the banknotes are fed out from the storage unit.

The conventional banknote handling apparatus includes a cassette for a reconciliation process which is an inventory checking process of checking presence/absence of abnormality in the inventory amount of banknotes in each storage unit. When the reconciliation process is performed and it is found that the number and the amount of banknotes actually stored in a storage unit do not match the number and the amount of banknotes whose information is managed in the inventory information for the storage unit, the inventory amount of banknotes in this storage unit is determined to be abnormal, and the cause of abnormality will be investigated.

In the reconciliation process, the banknote handling apparatus feeds out all the banknotes one by one from the storage unit to read the serial number of each banknote, and confirms that the serial number matches the serial number in the inventory information. During the reconciliation process, the banknotes having been checked are temporarily stored in the reconciliation cassette. After the reconciliation process is finished, the banknote handling apparatus feeds out all the banknotes one by one from the reconciliation cassette to return each banknote to the original storage unit in which each banknote was stored before starting the reconciliation process. Thus, all the banknotes stored in the storage unit can be made to coincide with the inventory information.

SUMMARY

In accordance with the present disclosure is a sheet handling apparatus for handling sheets, each sheet being assigned identification information capable of identifying each sheet. The apparatus includes a body; a transport path for transporting one or more sheets, the transport path provided inside the body; a receptacle that receives sheets from an outside of the sheet handling apparatus, and transfers the sheets to the transport path; recognition circuitry configured to acquire identification information of the sheets transported along the transport path; a storage that receives the sheets transported along the transport path and stores the sheets; a feeder that feeds out the sheets stored in the storage to the transport path; a discharge port in which the sheets are fed out from the feeder; a memory configured to store the identification information of the sheets stored in the storage; and control circuitry that performs an inventory checking process. In the inventory checking process, the control circuitry is configured to: control the feeder to feed out, from the storage, a part of the sheets that are stored in the storage in a case that necessity of checking an inventory amount of the sheets in the storage arises, control transport of the fed-out sheets to the recognition circuitry and out of the discharge port, and determine an abnormality in the inventory amount of the sheets in the storage by comparing the identification information of each of the fed-out sheets with the identification information stored in the memory.

BRIEF DESCRIPTION OF THE DRAWINGS

FIG. 7 is a flowchart illustrating an inventory checking process; and

FIG. 8 is a block diagram of computer-based circuitry that may be used to implement control features of the present disclosure.

DETAILED DESCRIPTION OF THE DRAWINGS

Figure 1:
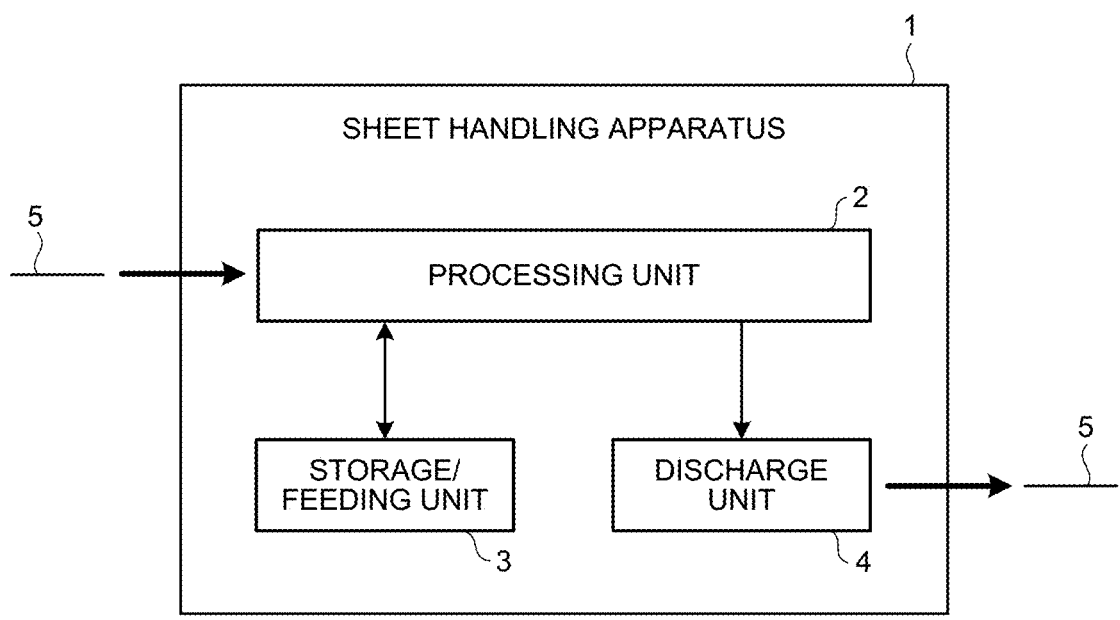
FIG. 1 is a schematic diagram illustrating an exemplary implementation of a sheet handling apparatus according to an embodiment.

In the aforementioned conventional art, all sheets need to be fed out from a storage unit and temporarily stored in another place during a reconciliation process, and the sheets need to be returned to an original storage unit after the reconciliation process. The sheet handling apparatus cannot perform another sheet handling process until all the sheets are returned to the original storage unit. This causes a problem that the sheet handling apparatus cannot be used for long periods of time.

In an exemplary implementation of the present application, a sheet handling apparatus and a sheet handling method are provided in which presence/absence of an abnormality in an inventory amount of sheets in a storage unit can be checked in a short time.

Hereinafter, a sheet handling apparatus and a sheet handling method according to an embodiment of the present disclosure will be described with reference to the accompanying drawings. First, an exemplary implementation of the sheet handling apparatus will be described with reference to a schematic diagram illustrated in FIG. 1.

A sheet handling apparatus 1 handles sheets 5. Each sheet 5 is assigned identification information for uniquely identifying the sheet 5. Sheets 5 of the same type can be distinguished from each other based on the identification information of each sheet. For example, a number, which is formed by using symbols and/or characters, is used as identification information. The characters may include numerical characters. For example, identification information is printed on a surface of a sheet 5. Alternatively, for example, identification information is recorded in a small-size information storage element included in a sheet 5.

The sheet handling apparatus 1 includes a storage/feeding unit 3 and a discharge unit 4. In addition, the sheet handling apparatus 1 includes a processing unit 2 for processing sheets 5 received from the outside. For example, the processing unit 2 includes a transport path, a recognition unit, and a control unit. The transport path is disposed inside the apparatus 1 and is provided with a transport mechanism (conveyer) including rollers and/or belts for transporting sheets 5. The recognition unit includes circuitry and/or a plurality of sensors such as an image sensor and a magnetic sensor, and obtains identification information of the sheets 5 being transported along the transport path. The control unit includes circuitry that controls the respective components, and performs recognition of the type of each sheet 5 and counting of the number of sheets 5, based on data obtained from the recognition unit. A structural configuration of the control unit is described below with respect to FIG. 8.

The sheet 5 processed in the processing unit 2 is sent to the storage/feeding unit 3 or the discharge unit 4. FIG. 1 shows the minimum apparatus configuration. The number of storage/feeding units 3 and the number of discharge units 4 included in the sheet handling apparatus 1 are not particularly limited. In an exemplary configuration, the sheet handling apparatus 1 as described in this disclosure includes any of a control unit, a control circuit, or an internal computer.

The storage/feeding unit 3 can store therein the sheets 5 received from the processing unit 2. The storage/feeding unit 3 includes a storage that stores sheets 5, and a feeder that feeds out the sheets 5 that have been stored in the storage. The sheets 5 fed out from the storage/feeding unit 3 are sent to the processing unit 2. These sheets 5 may be processed in the processing unit 2, and sent to the discharge unit 4.

The discharge unit 4 is a discharge port and/or dispensing device can discharge the sheets 5, which are received from the processing unit 2, from the sheet handling apparatus 1. For example, the discharge unit 4 has an opening opened to the outside of the sheet handling apparatus 1. When the sheets 5 transported from the processing unit 2 to the discharge unit 4 are to be discharged from the apparatus 1, the sheets 5 can be taken out from the opening of the discharge unit 4. The discharge unit 4 may be referred to as a dispensing unit of a conventional sheet handling apparatus. A configuration of the discharge unit 4 may correspond to the dispensing unit of the conventional sheet handling apparatus.

Figure 3:
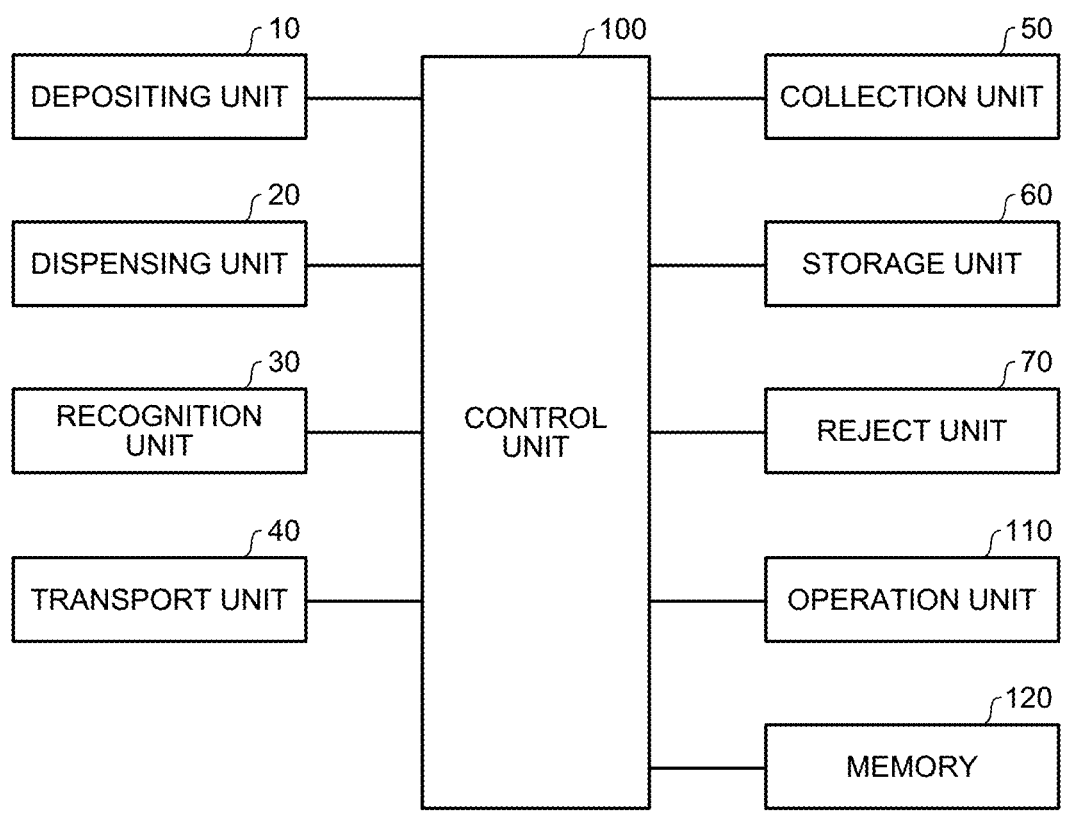
FIG. 3 is a block diagram schematically showing a functional configuration of the banknote handling apparatus.

The sheet handling apparatus 1 can manage identification information of each of a plurality of sheets 5 stored in the storage/feeding unit 3, by using a memory such as memory 120 illustrated in FIG. 3 and memory 1040 illustrated in FIG. 8. Specifically, identification information of each sheet 5 in the storage/feeding unit 3 is stored in the memory so that the identification information of the sheet 5 can be identified when the sheet 5 is fed out from the storage/feeding unit 3. For example, information in the memory includes the order in which the sheets 5 were stored in the storage/feeding unit 3.

The memory stores therein inventory information of the storage/feeding unit 3. The inventory information includes, for example, the number of sheets 5 in the storage/feeding unit 3. When there are a plurality of storage/feeding units 3, the inventory information may further include the type of sheets 5 stored in each storage/feeding unit 3. When a sheet 5 fed out from the storage/feeding unit 3 has been processed in the processing unit 2 and discharged from the discharge unit 4, the sheet handling apparatus 1 updates the inventory information in the memory. Specifically, the number of sheets 5 discharged from the discharge unit 4 is subtracted from the number of the sheets 5, which are currently stored in the storage/feeding unit 3, included in the inventory information.

When there is necessity of confirming that the number of sheets 5 stored in the storage/feeding unit 3 matches the inventory information in the memory, the sheet handling apparatus 1 determines that an inventory checking process should be performed. For example, if two or more sheets 5 are accidentally fed out simultaneously from the storage/feeding unit 3 when one sheet 5 should be fed out, the sheet handling apparatus 1 determines that it is should be checked whether or not information of the sheets 5 stored in the storage/feeding unit 3 matches the information of the sheets 5 managed in the memory. In the inventory checking process, the sheet handling apparatus 1 determines whether or not the number of the sheets 5 which are being stored in the storage/feeding unit 3 matches the number of sheets which is included in the inventory information, of the storage/feeding unit, in the memory. The inventory checking process may be referred to as a reconciliation process.

The sheet handling apparatus 1 can output the determination result obtained in the inventory checking process. For example, the sheet handling apparatus 1 can display the determination result on a display unit thereof. Alternatively, for example, the sheet handling apparatus 1 includes a communication unit for transmitting the determination result to an external device communicably connected to the sheet handling apparatus 1 via a network. Such features are illustrated in FIG. 8. The sheet handling apparatus 1 and/or the external device which has received the determination result from the sheet handling apparatus 1 may notify the determination result of the inventory checking process. Therefore, when the inventory information in the memory has an error, it is notified to a user and the user can investigate cause of the error and correct the inventory information.

The sheet handling apparatus 1, which has started the inventory checking process, specifies sheets 5 to be checked in the inventory checking process (FIG. 1, step A1). Specifically, the sheet handling apparatus 1 sets a part of the sheets 5 as check targets among the sheets 5 which are being stored in the storage/feeding unit 3 at the time when the sheet handling apparatus 1 determines to perform the inventory checking process. Also, the sheet handling apparatus 1 refers to the identification information stored in the memory and retrieves the identification information of each of the sheets 5 set as the check targets from the memory. Information for setting check targets is stored in the memory in advance. For example, information indicating that five sheets 5 in order from the first sheet 5, which is to be fed out first from the storage/feeding unit 3, should be set as check targets, is previously prepared in the memory.

The sheet handling apparatus 1 feeds out the sheets 5 set as check targets from the storage/feeding unit 3, reads identification information of the sheets 5 by the processing unit 2, and checks whether or not the read identification information matches the identification information retrieved from the inventory information in the memory (step A2).

For example, based on the condition in the setting previously prepared in the memory, the sheet handling apparatus 1 sets, as check targets, five sheets 5 in order from a sheet 5 to be firstly fed out from the storage/feeding unit 3, among the sheets 5 being stored in the storage/feeding unit 3 at the time when necessity of performing the inventory checking process arises. The sheet handling apparatus 1 feeds out these five sheets 5 from the storage/feeding unit 3, reads identification information of the sheets 5 by the recognition unit of the processing unit 2. The sheet handling apparatus 1 compares the five pieces of identification information read from the sheets 5 with five pieces of identification information, which have been stored in the memory so as to correspond to the five sheets 5. As for comparison of identification information, all digits of identification information of each sheet 5 read by the processing unit 2 may be compared with all digits of identification information stored in the memory so as to correspond to each sheet 5. Alternatively, it may be set that only a part of the digits of the read identification information is compared with the corresponding digits of the identification information stored in the memory.

When the five pieces of identification information read from the sheets 5 fed out from the storage/feeding unit 3 match the five pieces of identification information stored in the memory, the sheet handling apparatus 1 determines that the identification information of all the sheets 5 stored in the storage/feeding unit 3 matches the identification information stored in the memory. That is, the sheet handling apparatus 1 determines that the inventory information has no error. It means that information on the sheets 5 such as identification information of each sheet and the number of all sheets stored in the storage/feeding unit 3 matches the inventory information of the storage/feeding unit 3 managed in the memory.

The sheets 5 set as the check targets of the inventory checking process, whose identification information has been read by the processing unit 2, are sent to the discharge unit 4 (step A3). After the inventory checking process has ended, the sheets 5 sent to the discharge unit 4 are discharged from the apparatus 1 without being returned to the processing unit 2 and the storage/feeding unit 3 from the discharge unit 4. Therefore, the inventory information stored in the memory is updated after the inventory checking process has ended. After the update, information of the sheets 5 that have been sent to the discharge unit 4, i.e., the sheets 5 that have been set as the check targets and processed in the inventory checking process, is no longer included in the inventory information of the storage/feeding unit 3. Specifically, the sheet handling apparatus 1 subtracts "5", which is the number of sheets 5 fed out from the storage/feeding unit 3, from the number of sheets 5 in the inventory information stored in the memory. In addition, the sheet handling apparatus 1 deletes the five pieces of identification information of these five sheets 5 fed out from the storage/feeding unit 3, from the inventory information stored in the memory.

On the other hand, if the five pieces of identification information read from the sheets 5 that have been stored in the storage/feeding unit 3 do not match the five pieces of identification information stored in the memory, the sheet handling apparatus 1 determines that the inventory information, of the storage/feeding unit 3, in the memory has an error. That is, the sheet handling apparatus 1 determines that the information on the sheets 5 actually stored in the storage/feeding unit 3 does not match the inventory information of the storage/feeding unit 3 managed in the memory.

In this case, for example, it can be set that the sheet handling apparatus 1 repeats the processes of above described steps A1 to A3 a plurality of times before accepting the determination result.

Specifically, in this setting, the sheet handling apparatus 1 repeats the processes in steps A1 to A3 until the identification information read from the sheets 5 set as check targets matches the identification information included in the inventory information stored in the memory. An upper-limit number of times for the processes is previously set and stored in the memory and therefore, the sheet handling apparatus 1 cannot repeat the processes in steps A1 to A3 more than the upper-limit number of times. For example, the upper limit number of times is set 3. If the identification information of the sheets 5 set as check targets and fed out from the storage/feeding unit 3 matches the identification information stored in the memory before the number of processes exceeds the upper limit number of times, the sheet handling apparatus 1 determines that the inventory information has no error, and ends the inventory checking process. On the other hand, if the identification information of the sheets 5 fed out from the storage/feeding unit 3 does not match the identification information stored in the memory even when the number of the processes reached the upper limit number of times, the sheet handling apparatus 1 accepts the determination result that the inventory information in the memory has an error.

When the inventory information is in the abnormal state in which there is an error, the sheet handling apparatus 1 determines that the inventory information of the storage/feeding unit 3 needs to be corrected so as to be in the normal state in which there is no error. The sheet handling apparatus 1 performs a notification process of notifying a user that all the sheets stored in the storage/feeding unit 3 need to be checked.

As described above, in the inventory checking process performed in the sheet handling apparatus 1, only some sheets 5 among a plurality of sheets 5 in the storage/feeding unit 3 are fed out and checked, and the checked sheets 5 are not returned to the storage/feeding unit 3 but are discharged from the sheet handling apparatus 1 through the discharge unit 4. That is, in contrast to the reconciliation process of the conventional apparatus, the sheet handling apparatus 1 does not return the sheets 5, which have been fed out from the storage/feeding unit 3 and checked, to the storage/feeding unit 3. Therefore, the sheet handling apparatus 1 can finish the inventory checking process in a shorter time than the conventional apparatus. The checked sheets 5 are not returned to the storage/feeding unit 3 and therefore, the sheet handling apparatus 1 need not have a component, which temporarily stores the sheets 5 fed out from the storage/feeding unit 3 during the inventory checking process and feeds out the stored sheets 5 to return to the storage/feeding unit 3.

After necessity of checking the inventory information arose and the sheet handling apparatus 1 sets, as check targets, a predetermined number of sheets 5 which have been stored in the storage/feeding unit 3, another sheet(s) may be newly stored in the storage/feeding unit 3 before identification information of these sheets 5 set as the check targets is read. In this case, the sheet handling apparatus 1 checks the sheets 5 set as the check targets, after the newly stored sheet(s) 5 is fed out from the storage/feeding unit 3 and discharged to the discharge unit 4.

There may be a case where the sheet handling apparatus 1 has a plurality of storage/feeding units 3 including a first storage/feeding unit and a second storage/feeding unit, and the sheet handling apparatus 1 has to feed out a sheet(s) from the storage/feeding units 3 and process the sheet(s) by using the processing unit 2 under a situation where the inventory checking process needs to be performed for the first storage/feeding unit. In this case, the sheet handling apparatus 1 feeds out the sheets to be processed in the processing unit 2, from the first storage/feeding unit in preference to the second storage/feeding unit. That is, sheets of the storage/feeding unit set as the target of the inventory checking process are fed out first, to the processing unit 2, before sheets of other storage/feeding units are fed out. For example, when performing a dispensing process, the processing unit 2 processes sheets fed out from the storage/feeding units 3 and discharges processed sheets from the discharge unit 4 serving as a dispensing unit. In the dispensing process, the first storage/feeding unit storing sheets to be set as check targets of the inventory checking process is given priority over the second storage/feeding unit storing sheets not to be the check targets. Consequently, in the dispensing process, the sheets in the first storage/feeding unit are dispensed before the sheets in the second storage/feeding unit are dispensed. The processing unit 2 reads identification information from the sheets set as check targets fed out from the first storage/feeding unit during the dispensing process, whereby the sheet handling apparatus 1 can perform the inventory checking process based on the identification information of the dispensed sheets as described above.

The configuration of the sheet handling apparatus 1 is not limited to that shown in FIG. 1. The discharge unit 4 may serve as both a depositing unit that receives sheets 5 to be processed inside the apparatus 1 and a dispensing unit that stacks sheets 5 to be dispensed from the apparatus 1. For example, this configuration of the discharge unit 4 corresponds to the configuration of a cash inlet/outlet port of a conventional ATM (automated teller machine).

The discharge unit 4 may be a collection unit in which sheets 5 received from the processing unit 2 are stored as sheets 5 to be collected from the apparatus 1. Alternatively, the discharge unit 4 may be a collection unit which stores sheets 5 received from the processing unit 2 into a collection container for storing therein sheets 5 to be collected from the apparatus 1. For example, the collection unit may be drawable from the sheet handling apparatus 1, and the collection container may be attached to and detached from the drawn collection unit. The sheets 5 may be taken out from the apparatus 1 together with the collection container by dismounting the collection container, in which the sheets 5 are being stored, from the sheet handling apparatus 1. For example, this configuration of the discharge unit 4 corresponds to a collection unit, of a conventional sheet handling apparatus, in which sheets 5 are stored in a collection container such as a collection bag or a collection cassette. An example of the sheet handling apparatus 1 in which a collection unit functions as the discharge unit 4 will be described next, but the components and operations of the sheet handling apparatus 1 already described above will not be repeatedly described.

When the collection unit is used as the discharge unit 4, inventory information of the storage/feeding unit 3 and inventory information of the collection unit are stored in the memory. The inventory information of the collection unit includes the number of sheets 5 stored in the collection unit. When necessity of performing the inventory checking process on the storage/feeding unit 3 arises, the sheet handling apparatus 1 performs the aforementioned processes in steps A1 to A3. Consequently, some sheets set as check target of the inventory checking process are fed out from the storage/feeding unit 3, checked and stored in the collection unit, and the inventory information of the storage/feeding unit 3 and the inventory information of the collection unit are updated in the memory. Specifically, the sheet handling apparatus 1 subtracts the number of sheets fed out from the storage/feeding unit 3, from the number of the sheets being stored in the storage/feeding unit 3, which is included in the inventory information of the storage/feeding unit 3. Then, the sheet handling apparatus 1 adds the subtracted number to the number of the sheets being stored in the collection unit, which is included in the inventory information of the collection unit. In addition, the sheet handling apparatus 1 deletes, from the inventory information of the storage/feeding unit 3 managed in the memory, identification information of the sheets fed out from the storage/feeding unit 3 during the inventory checking process.

When the discharge unit 4 is the collection unit, the number of sheets which can be stored in the collection unit is limited to a predetermined upper limit number. When starting the inventory checking process, the number of sheets being stored in the collection unit may already reach or may be close to the upper limit number. Therefore, the sheet handling apparatus 1 determines whether or not the sheets set as check targets in step A1 can be stored in the collection unit before starting the inventory checking process. Information needed for the determination is stored in the memory in advance. Upon determining that the inventory checking process cannot be performed because the sheets set as the check targets cannot be stored in the collection unit, the sheet handling apparatus 1 does not start the inventory checking process. The sheet handling apparatus 1 stores, in the memory, information indicating that the inventory checking process for the storage/feeding unit 3 is necessary, instead of starting the inventory checking process. In addition, the sheet handling apparatus 1 performs a notification process of notifying a user that the inventory checking process is to be performed. For example, the notification process is performed by displaying, on the display unit of the sheet handling apparatus 1, information that the inventory checking process is necessary. If there are the storage/feeding unit 3 which is the collection unit and another storage/feeding unit 3, information indicating which storage/feeding unit 3 requires the inventory checking process may also be displayed.

Sheets 5 to be handled by the sheet handling apparatus 1 include banknotes and checks. However, the types of sheets 5 to be handled by the sheet handling apparatus 1 are not particularly limited as long as each sheet 5 is assigned identification information that can uniquely identify each sheet 5 and the sheet handling apparatus 1 can obtain the identification information from each sheet 5. Hereinafter, a banknote handling apparatus for handling banknotes will be described as an example of the sheet handling apparatus 1.

Figure 2:
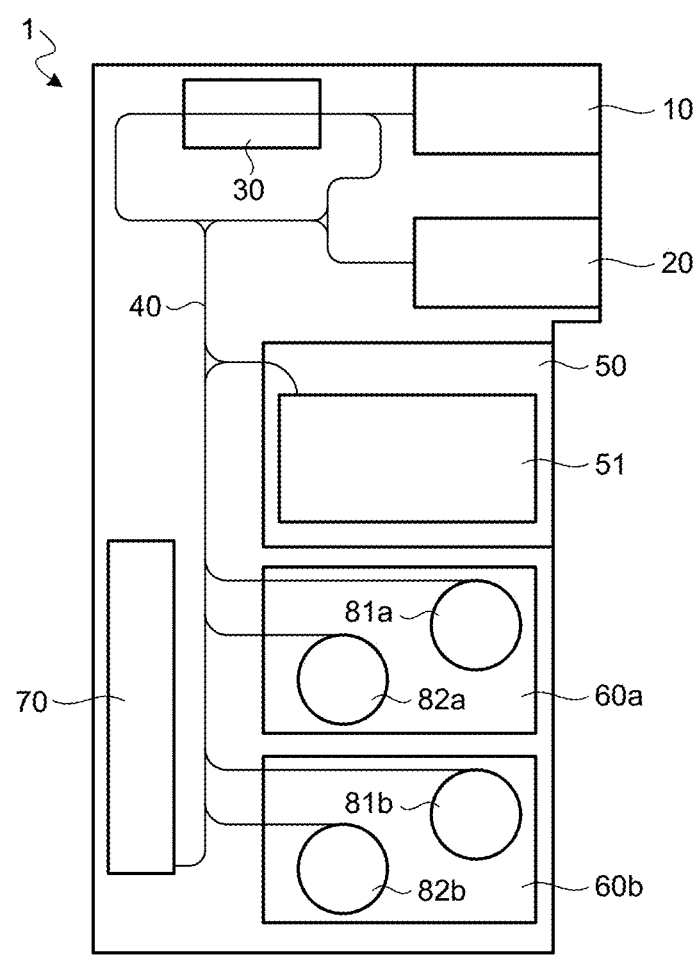
FIG. 2 is a cross-sectional view schematically showing an internal configuration of the banknote handling apparatus according to the embodiment.

FIG. 2 is a cross-sectional view schematically showing an internal configuration of a banknote handling apparatus (sheet handling apparatus) 1 according to the present embodiment. FIG. 3 is a block diagram schematically showing a functional configuration of the banknote handling apparatus 1. The banknote handling apparatus 1 is installed at a checkout counter in a store, together with a coin handling apparatus, for example. When a transaction with a customer is performed in the store, the banknote handling apparatus 1 performs a depositing process for depositing banknotes paid by the customer to purchase items, and a dispensing process for dispensing banknotes to be returned as change to the customer.

The banknote handling apparatus 1 includes a depositing unit 10, a dispensing unit 20, a recognition unit 30, a transport unit 40, a collection unit 50, a plurality of storage units 60 (60a, 60b), and a reject unit 70. The depositing unit 10 receives banknotes to be deposited during the depositing process. In an exemplary implementation, the depositing unit 10 is a depository, repository, dispensary or other type of receptacle that receives banknotes during the depositing process. The dispensing unit 20 stacks banknotes to be dispensed during the dispensing process. In some implementations, a container is one or both the depositing unit 10 and the dispensing unit 20, performing one or both of the depositing process and the dispensing process. The storage unit 60 and the recognition unit 30 shown in FIG. 2 correspond to the storage/feeding unit 3 and the processing unit 2 shown in FIG. 1, respectively. Each of the dispensing unit 20 and the collection unit 50 shown in FIG. 2 corresponds to the discharge unit 4 shown in FIG. 1. In order to describe an inventory checking process using the dispensing unit 20 and an inventory checking process using the collection unit 50, the banknote handling apparatus 1 shown in FIG. 2 includes both of these units. However, the banknote handling apparatus 1 may include only one of the dispensing unit 20 and the collection unit 50.

The recognition unit 30 includes various types of sensors such as an image sensor, an ultrasonic sensor, and a magnetic sensor. Using the sensors, the recognition unit 30 can acquire recognition data for recognizing the type of each of banknotes to be deposited and banknotes to be dispensed, and acquire image data for reading the serial number of each banknote. The recognition data includes, for example, data for recognizing the denomination, authenticity, and fitness of each banknote. The recognition unit 30 transmits the acquired recognition data and image data to the control unit 100 shown in FIG. 3. The serial number is identification information that can identify the banknote.

A transport path that connects the depositing unit 10, the dispensing unit 20, the recognition unit 30, the collection unit 50, the storage unit 60, and the reject unit 70 is disposed inside the banknote handling apparatus 1. The transport unit 40 includes: a transport mechanism (conveyer) having rollers and/or belts for transporting banknotes along the transport path; and a diversion mechanism for changing the transport direction of each banknote at each branching point disposed on the transport path.

The collection unit 50 is drawable from the front side (right side in FIG. 2), on which the depositing unit 10 and the dispensing unit 20 are present, of the apparatus 1. A collection container 51 for collecting banknotes is mountable and dismountable with respect to the collection unit 50. For example, a collection bag or a collection cassette is used as the collection container 51. A clerk of the store draws out the collection unit 50 from the apparatus 1, mounts the collection container 51 to the collection unit 50, and returns the collection unit 50 into the apparatus 1. Then, the collection unit 50 is connected to the transport path inside the apparatus 1. The collection unit 50 receives banknotes transported along the transport path, and stores these banknotes into the collection container 51. The collection unit 50 does not feed out banknotes to the transport path, and only stores, into the collection container 51, banknotes to be collected from the apparatus 1. That is, the collection unit 50 stores banknotes into the mountable/dismountable collection container 51 so that the banknotes cannot be fed out from the collection container 51. After banknotes are stored in the collection container 51, the clerk draws out the collection unit 50 from the apparatus 1, and removes the collection container 51, in which the banknotes have been stored, from the collection unit 50, thereby collecting the banknotes together with the collection container 51 from the apparatus 1.

The storage unit 60 is a tape-type storage/feeding unit. Four drums 81 (81a, 81b) and 82 (82a, 82b) are included in two storage units 60a and 60b. The storage unit 60a performs storage and feeding-out of banknotes by using the two drums 81a, 82a. The storage unit 60b performs storage and feeding-out of banknotes by using the two drums 81b, 82b. Specifically, the drum 81 (82), having an outer circumferential surface to which one end of a tape is fixed, is rotated, and banknotes having been transported along the transport path are wound together with the tape onto the outer circumferential surface of the drum (82), whereby the banknotes are stored on the drum 81 (82). When feeding out the stored banknotes, the drum 81 (82) is rotated in a direction opposite to the direction for storing the banknotes, and the banknotes wound on the outer circumferential surface of the drum 81 (82) are fed out to the transport path. The clerk can set the type of banknotes to be stored in the storage unit 60. For example, the clerk sets the denominations of banknotes to be stored on the respective drums 81a, 81b, 82a, and 82b, whereby banknotes of four denominations can be stored in the two storage units 60a, 60b.

The reject unit 70 stores reject banknotes therein to keep them inside the apparatus 1. For example, when a banknote is recognized as a counterfeit note, this banknote is kept in the reject unit 70 as a reject banknote to be examined later.

As shown in FIG. 3, the banknote handling apparatus 1 includes a control unit 100, an operation unit 110, and a memory 120, in addition to the components shown in FIG. 2. The control unit 100 may also be encompassed by or comprise control circuitry and/or processing circuitry. A structural configuration and further discussion relating to control unit 100, operation unit 110 and memory 120 is provided below with respect to FIG. 8.

The operation unit 110 functions as an input unit for inputting various information to the banknote handling apparatus 1, and as a display unit for displaying various information. The clerk, by operating the operation unit 110, can execute banknote handling, update of settings related to banknote handling, and confirmation of information related to banknote handling.

For example, an operation terminal device including an operation unit and a display unit may be communicably connected to the banknote handling apparatus 1 and used as the operation unit 110. Alternatively, for example, the banknote handling apparatus 1 may be provided with a touch panel type liquid crystal display which is used as the operation unit 110.

For example, when the banknote handling apparatus 1 is used for checkout at the checkout counter, a cash register including an operation unit and a display unit may be communicably connected to the banknote handling apparatus 1 and used as the operation unit 110. Alternatively, for example, a POS (Point of Sales) terminal device including an operation unit and a display unit may be communicably connected to the banknote handling apparatus 1 and used as the operation unit 110.

The memory 120 is a non-volatile memory device. The memory 120 is used for storing the inventory information of the collection unit 50 and the storage unit 60. The inventory information of the collection unit 50 includes information indicating the denominations, the number for each denomination, and the serial numbers of banknotes collected into the collection unit 50, i.e., stored in the collection container 51.

The inventory information of the storage unit 60 includes information indicating the denominations, the number for each denomination, and the serial numbers of banknotes stored on each of the two drums 81a, 82a in the storage unit 60a. In addition, the inventory information of the storage unit 60 includes information indicating the denominations, the number for each denomination, and the serial numbers of banknotes stored on each of the two drums 81b, 82b in the storage unit 60b. The serial numbers of the banknotes are managed in association with the order (storage order) in which the banknotes were stored on the drums 81, 82. This enables the control unit 100 to identify, based on the inventory information, the denomination and the serial number of each banknote fed out, one by one, from the storage unit 60. That is, the control unit 100 can identify the denomination and the serial number of a banknote to be fed out from each of the four drums 81a, 81b, 82a, and 82b in the storage units 60a, 60b.

The memory 120 is also used for storing information necessary for operations of the control unit 100. The control unit 100 controls the components shown in FIG. 2 and FIG. 3 while referring to the information stored in the memory 120, based on an operation performed on the operation unit 110, thereby realizing the functions and the operations of the banknote handling apparatus 1 described in the present embodiment.

Figure 4:
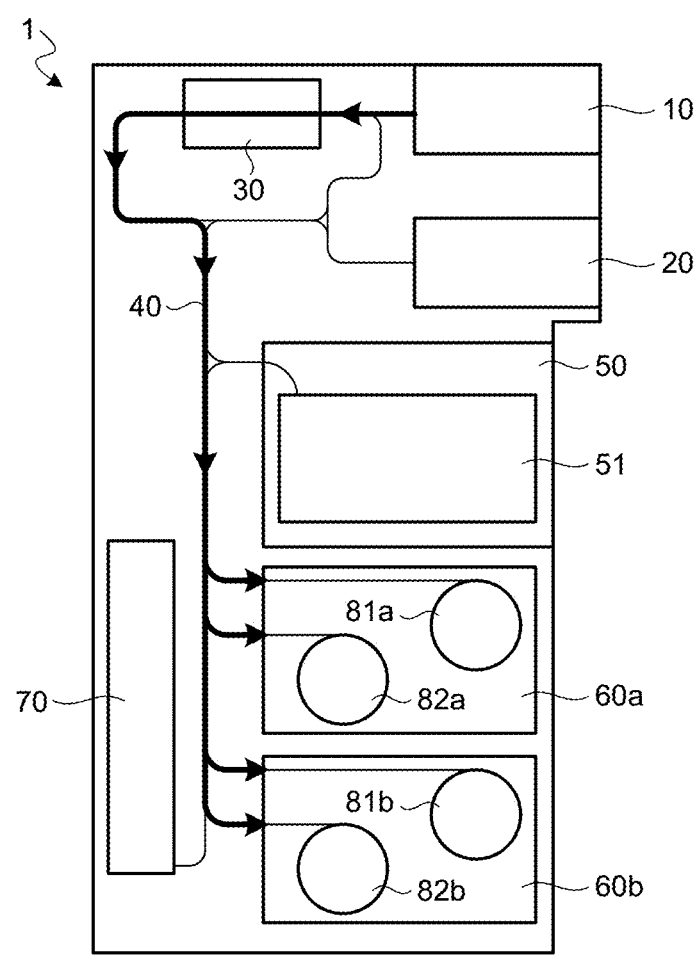
FIG. 4 schematically illustrates a depositing process performed by the banknote handling apparatus.

The banknote handling apparatus 1 can perform various types of banknote handling. FIG. 4 schematically illustrates a depositing process performed by the banknote handling apparatus 1. The clerk starts the depositing process by operating the operation unit 110. The depositing process is a process of receiving banknotes from the outside and storing these banknotes inside the apparatus 1.

The clerk can place a plurality of banknotes to be deposited, on the depositing unit 10. The depositing unit 10 is controlled by the control unit 100 to feed out the placed banknotes one by one to the transport path in the apparatus 1. The transport unit 40 is controlled by the control unit 100 to transport the banknotes along the transport path as shown by arrows in FIG. 4.

The recognition unit 30 is controlled by the control unit 100 to acquire recognition data and image data from each banknote being transported along the transport path. The control unit 100 receives the recognition data and the image data from the recognition unit 30. The control unit 100 recognizes the type of each banknote based on the recognition data, and determines whether or not the banknote can be deposited. The control unit 100 performs OCR (Optical Character Recognition) on the image data to read the serial number of each banknote.

When the control unit 100 determines that a banknote can be deposited, the banknote is transported to the storage unit 60 corresponding to the type of the banknote based on the recognition result. The storage unit 60 stores therein the transported banknote. Specifically, the banknote is wound and stored by any of the four drums 81a, 81b, 82a, and 82b corresponding to the recognition result. The control unit 100 updates the inventory information stored in the memory 120. Specifically, the inventory information of the storage unit 60 is updated based on the recognition result and the serial number of the banknote stored in this storage unit 60.

When the control unit 100 determines that a banknote cannot be deposited, the banknote is transported to the dispensing unit 20 as a reject banknote. The dispensing unit 20 stacks the transported banknote. If setting information indicating that counterfeit banknotes should be kept inside the apparatus 1 is stored in the memory 120 in advance, a reject banknote recognized as a counterfeit banknote by the control unit 100 is transported to the reject unit 70. The reject unit 70 stores therein the transported reject banknote to keep it inside the apparatus 1. The reject banknote stored in the reject unit 70 will be collected from the apparatus 1 by the clerk.

Figure 5:
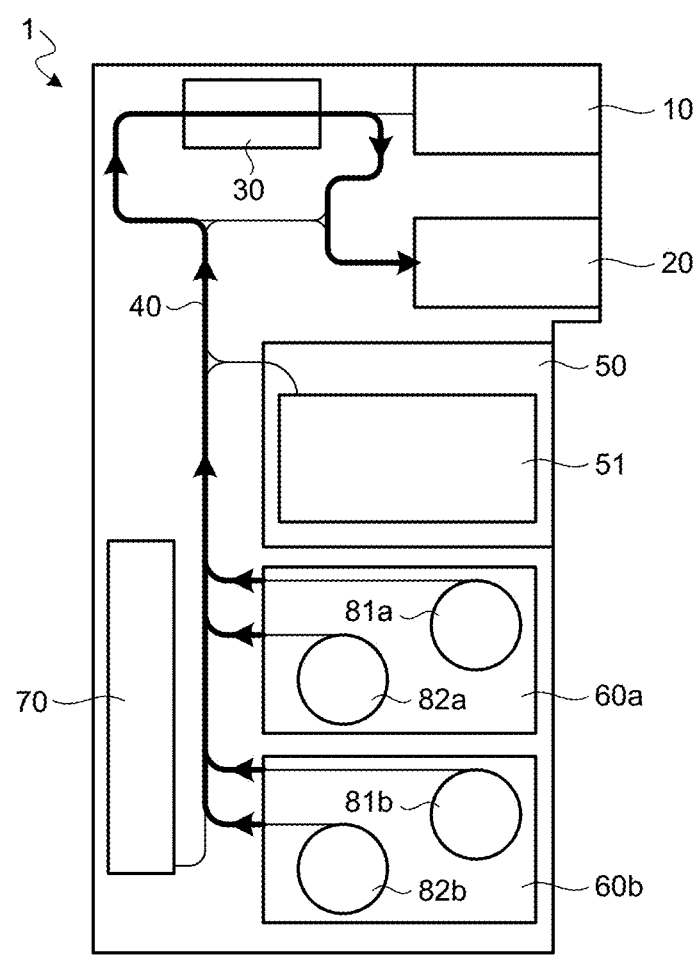
FIG. 5 schematically illustrates a dispensing process performed by the banknote handling apparatus.

The clerk can perform the dispensing process by operating the operation unit 110. FIG. 5 schematically illustrates the dispensing process performed by the banknote handling apparatus 1. The clerk operates the operation unit 110 to input information indicating the details of money to be dispensed in the dispensing process. The inputted information is transmitted from the operation unit 110 to the control unit 100. The storage unit 60 is controlled by the control unit 100 to feed out banknotes to be dispensed, one by one, to the transport path. Specifically, the banknotes to be dispensed are fed out from any of the four drums 81a, 81b, 82a, and 82b, one by one, to the transport path. The transport unit 40 is controlled by the control unit 100 to transport the banknotes as indicated by arrows in FIG. 5.

The recognition unit 30 is controlled by the control unit 100 to acquire recognition data and image data from each banknote being transported along the transport path. The control unit 100 receives the recognition data and the image data from the recognition unit 30. The control unit 100 recognizes the type of each banknote based on the recognition data. The control unit 100 performs OCR on the image data to read the serial number of each banknote.

The banknotes are transported from the recognition unit 30 to the dispensing unit 20. The dispensing unit 20 stacks the transported banknotes. The clerk can take out the dispensed banknotes from the apparatus 1 through the dispensing unit 20. The control unit 100 updates the inventory information stored in the memory 120. Specifically, the inventory information of the storage unit 60 is updated based on the recognition result and the serial numbers of the dispensed banknotes.

The clerk can perform a collection process by operating the operation unit 110. The collection process is a process of storing, in the collection container 51 of the collection unit 50, banknotes to be collected from the banknote handling apparatus 1 to the outside. The clerk executes the collection process by operating the operation unit 110. After banknotes to be collected are stored in the collection container 51, the clerk removes the collection container 51 from the collection unit 50 to collect the banknotes from the apparatus 1.

Figure 6A:
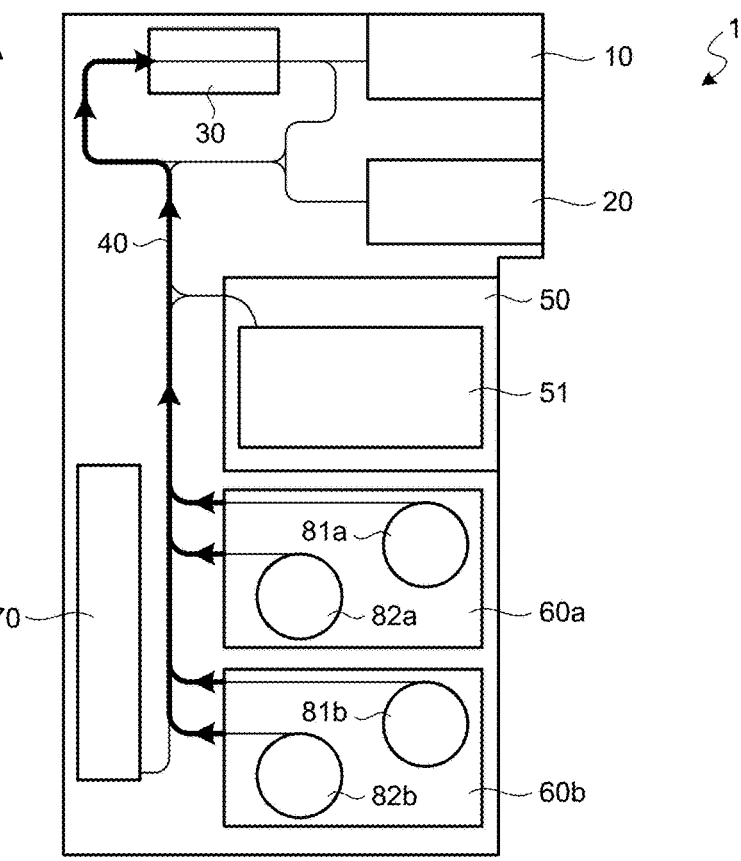
FIG. 6A and FIG. 6B schematically illustrate a collection process performed by the banknote handling apparatus.
Figure 6B:
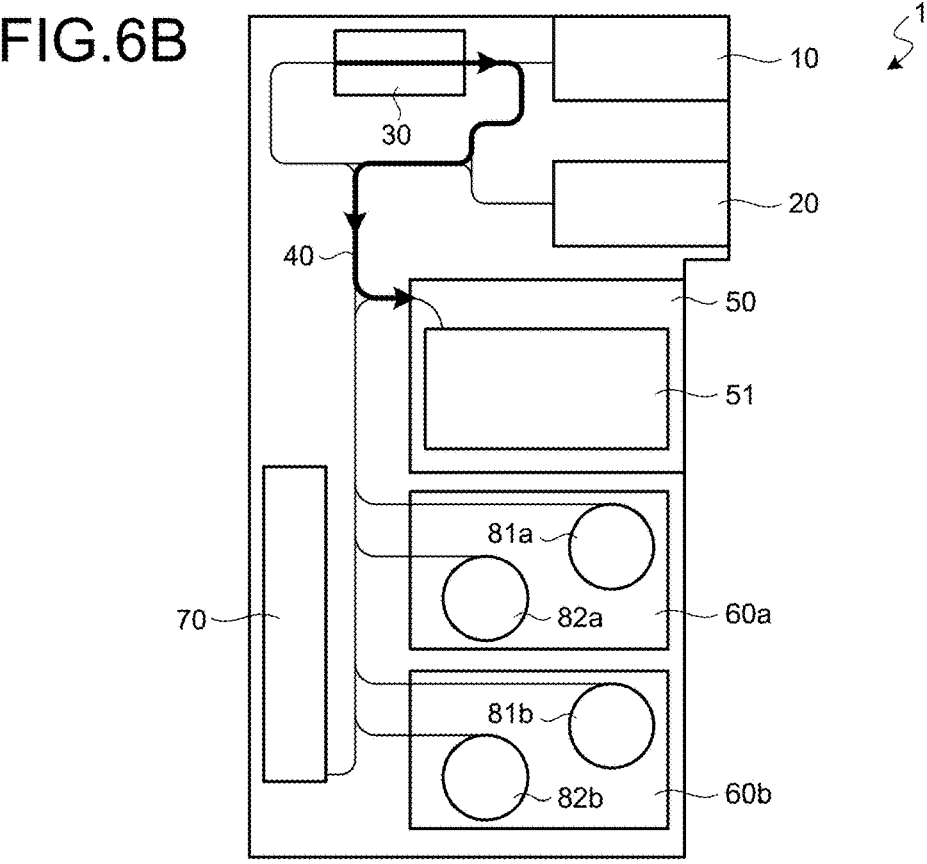

FIGS. 6A and 6B schematically illustrate the collection process performed by the banknote handling apparatus 1. In the collection process, banknotes fed out from the storage unit 60 to the transport path are transported to the collection unit 50 via the recognition unit 30. Since a transport route from the storage unit 60 to the recognition unit 30 partially overlaps a transport route from the recognition unit 30 to the collection unit 50, the former route is shown in FIG. 6A while the latter route is shown in FIG. 6B.

After the collection process is started, banknotes to be collected, which are present in the storage unit 60, are fed out one by one to the transport path, and are transported to the recognition unit 30 as shown by arrows in FIG. 6A. After the recognition unit 30 acquires recognition data and image data from each banknote, the banknotes are transported to the collection unit 50 as shown by arrows in FIG. 6B. The collection unit 50 stores the transported banknotes into the collection container 51.

The control unit 100 receives the recognition data and the image data from the recognition unit 30, recognizes the type of each banknote based on the recognition data. The control unit 100 performs OCR on the image data to read the serial number of each banknote. The control unit 100 updates the inventory information stored in the memory 120. Specifically, the inventory information of the collection unit 50, i.e., the inventory information of the collection container 51, is updated based on the recognition result and the serial number of the banknotes stored in the collection container 51.

The banknote handling apparatus 1 determines whether or not it is necessary to perform an inventory checking process of checking the inventory amount of banknotes in the storage unit 60. The inventory checking process is a process of confirming that the number and the amount of banknotes stored in the storage unit 60 match the number and the amount of banknotes whose information is managed in the inventory information stored in the memory 120. If the information of the banknotes actually stored in the storage unit 60 matches the information of the banknotes managed by the inventory information, the sheet handling apparatus 1 determines that the inventory amount of banknotes in the storage unit 60 has no error, that is, the inventory information of the storage unit 60 has no error. In the inventory checking process of the sheet handling apparatus 1, some banknotes stored in the storage unit 60 are checked, and then collected or dispensed, whereas, in the conventional apparatus, all banknotes stored in the storage unit are checked, temporarily stored in another place, and then returned to the original storage unit.

For example, when the inventory amount of banknotes on one drum in the storage unit is to be checked, some banknotes stored on this drum are checked. Meanwhile, for example, when the inventory amount of one storage unit is to be checked, some banknotes stored on each of all the drums in this storage unit are checked. The process of checking banknotes is performed similarly for each storage unit, and similarly for each drum. Hereinafter, the description will be continued for an example of checking banknotes on one drum 81 in the storage unit 60. In the example, for simplification, the drum 81 is referred to as the storage unit 60.

FIG. 7 is a flowchart illustrating the inventory checking process. When necessity of checking the inventory amount of banknotes in a storage unit 60 arises, the banknote handling apparatus 1 sets a predetermined number of banknotes, as check targets for the inventory checking process, out of banknotes stored in this storage unit 60. The banknote handling apparatus 1 feeds out the banknotes set as the check targets from the storage unit 60, and checks the banknotes to determine presence/absence of abnormality in the inventory amount of banknotes in the storage unit 60. The clerk can change the number of banknotes to be check targets by setting. The number of banknotes set as check targets is not particularly limited, and may be one or two or more. Hereinafter, the description will be continued assuming that five banknotes are set as check targets.

The banknote handling apparatus 1 monitors whether or not it is necessary to check the banknotes in the storage unit 60 (step S1; No). For example, if jamming of banknotes occurs while banknotes are stored in and/or fed out from the storage unit 60 and the clerk performs work for eliminating this jamming, the banknote handling apparatus 1 determines that the inventory amount of banknotes in the storage unit 60 needs to be checked (step S1; Yes).

When necessity of checking the inventory amount of banknotes in the storage unit 60 arises, the banknote handling apparatus 1 sets, as check targets, five banknotes in total based on the order of feeding out from the storage unit 60 (step S2). The five banknotes from the first banknote, which is to be fed out first from the storage unit 60, to the fifth banknote are initially set as the check targets.

The banknote handling apparatus 1 performs a notification process of notifying the clerk that necessity of checking the inventory amount has arisen (step S3). For example, this notification process is performed by displaying, on the screen of the operation unit 110, information indicating that necessity of checking the inventory amount has arisen in the banknote handling apparatus 1, and information indicating the storage unit 60 to be checked. If the banknote handling apparatus 1 is connected to a cash register at the checkout counter of the store, the notification process may be performed by using a display unit of the cash register.

The banknote handling apparatus 1 determines whether or not the inventory checking process can be performed (step S4). In this step, the banknote handling apparatus 1 determines whether or not banknotes set as the check targes can be fed out from the storage unit 60 and/or stored in the collection container 61. The banknote handling apparatus 1 can perform the inventory checking process in one of a plurality of methods. In the first method, the banknote handling apparatus 1 feeds out a banknote set as a check target from the storage unit 60 and checks the banknote, and thereafter collects the banknote into the collection container 51 of the collection unit 50. In the second method, the banknote handling apparatus 1 feeds out a banknote set as a check target from the storage unit 60 and checks the banknote, and thereafter dispenses the banknote from the dispensing unit 20. The clerk can select the method of the inventory checking process. For example, the clerk can change, by setting, whether banknotes set as the check targets should be checked while being collected or while being dispensed.

The banknote handling apparatus 1 determines whether or not banknotes, which are to be stored in the collection container 51 during the inventory checking process, can be stored in the collection container 51. For example, if it is set that the inventory amount should be checked while collecting banknotes, the banknote handling apparatus 1 determines whether or not the five banknotes set as check targets can be stored in the collection container 51 after checking these five banknotes (step S4). If the five banknotes cannot be stored in the collection container 51, the banknote handling apparatus 1 determines that the inventory checking process cannot be performed (step S4; No). For example, if 396 or more banknotes are stored in the collection container 51 capable of containing 400 banknotes and therefore not all the five banknotes can be stored in the collection container 51, the banknote handling apparatus 1 determines that the inventory checking process cannot be performed.

The banknote handling apparatus 1 determines whether or not banknotes, which are to be fed out from the storage unit 60 during the inventory checking process, can be fed out from the storage unit 60. For example, if it is set that the inventory amount should be checked while dispensing banknotes, the banknote handling apparatus 1 determines whether or not five banknotes set as check targets can be dispensed, i.e., fed out, from the storage unit 60 (step S4). If five banknotes cannot be fed out from the storage unit 60, the banknote handling apparatus 1 determines that the inventory checking process cannot be performed (step S4; No).

For example, when the number of banknotes stored in the storage unit 60 is equal to or less than a predetermined threshold number, the banknote handling apparatus 1 determines that the inventory checking process cannot be performed (step S4; No). In the banknote handling apparatus 1, a threshold number of banknotes, at which replenishment of the storage unit 60 with banknotes is required, is set as a "near empty" number of banknotes. The "near empty" number can be set for each denomination of banknotes stored in the storage unit 60. For example, if the "near empty" number is set to 20 and the number of banknotes in the storage unit 60 will be 20 or less if five banknotes set as check targets are fed out from the storage unit 60, the banknote handling apparatus 1 determines that the inventory checking process cannot be performed.

When the inventory checking process cannot be performed (step S4; No), the banknote handling apparatus 1 notifies the clerk of this fact (step S15), and ends the process. For example, this notification is performed by displaying, on the screen of the operation unit 110, information indicating that the inventory checking process cannot be performed, and information indicating the reason why the inventory checking process cannot be performed.

When the inventory checking process can be performed (step S4; Yes), the banknote handling apparatus 1 confirms whether the setting is prepared for collecting banknotes, which have been fed out from the storage unit 60 and checked, into the collection unit 50, or for dispensing the banknotes from the dispensing unit 20 (step S5).

When the setting is prepared such that banknotes should be checked while being collected (step S5; Yes), the banknote handling apparatus 1 feeds out the banknotes one by one from the storage unit 60 and reads the serial number of each banknote (step S6), and thereafter transports the banknote to the collection unit 50 to store the banknote in the collection container 51 (step S7) as described in FIG. 6.

The banknote handling apparatus 1 feeds out the five banknotes set as check targets one by one from the storage unit 60, and reads the serial number of each banknote. The banknote handling apparatus 1, which has stored the first banknote into the collection container 51, needs to check the remaining four banknotes (step S8; No) and therefore, repeats steps S6 and S7. During the processes in steps S6 and S7, information indicating that the inventory checking process is being performed is displayed on the screen of the operation unit 110.

If the banknote handling apparatus 1 could not read the serial number of a banknote fed out from the storage unit 60, the banknote handling apparatus can store this banknote in the collection container 51 and exclude this banknote from the check targets. The banknote handling apparatus 1 can repeat steps S6 and S7 until the serial numbers of five banknotes, which have been stored in the storage unit 60 when necessity of checking the inventory amount of banknotes in the storage unit 60 arose, are acquired.

For example, when the banknote handling apparatus 1 could not read the serial number of the first banknote fed out from the storage unit 60, the banknote handling apparatus 1 may feed out six banknotes from the storage unit 60 to read the serial numbers of five banknotes. That is, the serial numbers of five banknotes may be acquired by feeding out more than six banknotes sequentially from the storage unit 60.

An upper limit may be set on the number of banknotes to be fed out from the storage unit 60 during the inventory checking process. For example, the upper limit may be set to 10. In this case, if the number of fed-out banknotes has reached 10 while the banknote handling apparatus 1 cannot acquire the serial numbers of five banknotes through repetition of steps S6 and S7, the banknote handling apparatus 1 suspends the inventory checking process and notifies the clerk of this suspension.

Upon receiving the notification, the clerk can select, by operating the operation unit 110, whether the inventory checking process should be continued using the acquired four or less serial numbers, or more banknotes should be fed out from the storage unit 60 to continue the inventory checking process after the serial numbers of five banknotes are acquired. When continuing the inventory checking process using only the acquired serial numbers has been selected, the banknote handling apparatus 1 continues the subsequent process by using the already acquired serial numbers. When feeding out more banknotes from the storage unit 60 has been selected, the banknote handling apparatus 1 repeats steps S6 and S7 to acquire the serial numbers of five banknotes. Hereinafter, the description will be continued assuming that the serial numbers of five banknotes have been acquired.

After the serial numbers of five banknotes set as check targets have been acquired (step S8; Yes), the banknote handling apparatus 1 determines whether there is any problem in the inventory amount of banknotes in the storage unit 60, based on the acquired five serial numbers (step S13).

If no banknote handling is being performed in the banknote handling apparatus 1 when necessity of checking the inventory amount of banknotes in the storage unit 60 arises in step S1, step S6 and subsequent steps are immediately started. On the other hand, for example, if the depositing process or the dispensing process is being performed in the banknote handling apparatus 1, the banknote handling apparatus 1 starts step S6 and subsequent steps after finishing the process being performed. In this case, the banknote handling apparatus 1 performs steps S6 and S7 on the banknotes which have been stored in the storage unit 60 when necessity of checking the banknotes in the storage unit 60 arose. For example, if the depositing process is being performed, another banknote may be newly stored in the storage unit 60 after setting other banknotes as check targets in step S2. In this case, the banknote handling apparatus 1 feeds out the newly stored banknote and stores this banknote in the collection container 51 of the collection unit 50, and thereafter acquires the serial numbers of the banknotes set as check targets as described above. If the dispensing process is being performed, the banknote handling apparatus 1 can acquire serial numbers of the banknotes set as the check targets when dispensing these banknotes and performs subsequent processes based on the acquired serial numbers.

When the setting is prepared such that banknotes should be checked while being dispensed (step S5; No), the banknote handling apparatus 1 waits until the dispensing process is started (step S9; No). When the dispensing process is started (step S9; Yes), the banknote handling apparatus 1 feeds out banknotes one by one from the storage unit 60 and reads the serial number of each banknote (step S10), and transports the banknote to the dispensing unit 20 to dispense the banknote (step S11) as described in FIG. 5.

During the dispensing process, the banknote handling apparatus 1 acquires the serial numbers of the five banknotes that have been set as check targets in step S2. The banknote handling apparatus 1, which has dispensed the first banknote, needs to check the remaining four banknotes (step S12; No), and therefore returns to step S9 and repeats steps S10 and S11. During the processes in steps S10 and S11, information indicating that the inventory checking process is being performed is displayed on the screen of the operation unit 110.

If the banknote handling apparatus 1 could not read the serial number of a banknote fed out from the storage unit 60, this banknote is dispensed from the dispensing unit 20 and is excluded from the check targets. As described in the case of checking banknotes while collecting them, the banknote handling apparatus 1 can repeat steps S10 and S11 until the serial numbers of five banknotes, which have been stored in the storage unit 60 when necessity of checking the inventory amount of banknotes in the storage unit 60 arose in step S1, are acquired. For example, six or more banknotes may be dispensed in order to acquire the serial numbers of five banknotes.

If not all the five banknotes set as check targets have been dispensed during one dispensing process, the banknote handling apparatus 1 returns to the stand-by mode in step S9 (step S9; No), and performs steps S10 and S11 in the subsequent dispensing process to acquire the serial numbers of the remaining banknotes.

Steps S10 and S11 are repeatedly performed during one or a plurality of dispensing processes, until the serial numbers of five banknotes, which have been stored in the storage unit 60 when necessity of checking the inventory amount arose, are acquired. When the serial numbers of the five banknotes set as check targets have been acquired (step S12; Yes), the banknote handling apparatus 1 determines whether or not there is any problem in the inventory amount of banknotes in the storage unit 60, based on the acquired five serial numbers (step S13).

Until acquiring the serial numbers of five banknotes set as check targets, the banknote handling apparatus 1 performs the dispensing process by preferentially using the storage unit 60 subjected to the inventory checking process. That is, in order to acquire the serial numbers of five banknotes set as check targets as soon as possible, the banknote handling apparatus 1 performs the dispensing process by preferentially using the drums 81 on which the banknotes set as check targets are stored.

For example, 5-euro notes and 10-euro notes are respectively stored on the drum 81*a* and the drum 82*a* in the storage unit 60*a*, and 20-euro notes and 50-euro notes are respectively stored on the drum 81*b* and the drum 82*b* in the storage unit 60*b*. It is assumed that jamming of banknotes occurs on the drum 81*a* storing 5-euro notes in the storage unit 60*a*, and work for eliminating this jamming causes necessity of checking the banknotes stored on this drum 81*a*.

Under this situation, for example, if 25 euro is required to be dispensed as change in a transaction with a customer, the banknote handling apparatus 1 dispenses five 5-euro notes although two 10-euro notes and one 5-euro note are usually dispensed. That is, the banknote handling apparatus 1 preferentially dispenses 5-euro notes, which are check targets, during the inventory checking process although the change should usually be dispensed in denominations combined so as to minimize the number of dispensed banknotes. As a result, the banknote handling apparatus 1 can acquire the serial numbers of the five 5-euro banknotes, which are check targets, by performing one dispensing process.

For another example, if dispensing of 10 euro as change is required in a transaction with a customer, the banknote handling apparatus 1 dispenses two 5-euro notes although one 10-euro note are usually be dispensed, and reads the serial numbers of these two 5-euro notes out of the five 5-euro notes set as check targets. Thereafter, for example, if dispensing of 15 euro as change is required in a transaction with another customer, the banknote handling apparatus 1 dispenses three 5-euro notes although one 10-euro note and one 5-euro note are usually be dispensed, and reads the serial numbers of these three 5-euro notes which had remained in the storage unit 60 out of the five 5-euro notes set as check targets. As a result, the banknote handling apparatus 1 can acquire the serial numbers of the five 5-euro banknotes, which are check targets, by performing two dispensing processes.

If no banknote handling is being performed in the banknote handling apparatus 1 when necessity of checking the inventory amount of banknotes in the storage unit 60 arises, step S9 and subsequent steps are immediately started. However, if any banknote handling is being performed, step S9 and subsequent steps will be started after the banknote handling is finished. The banknote handling apparatus 1 sets, as check targets, banknotes which have been stored in the storage unit 60 at the time when necessity of confirming the inventory amount arises, and reads the serial numbers of a predetermined number of banknotes. If another banknote is newly stored in the storage unit 60, the banknote handling apparatus 1 checks the banknotes set as the check targets after the newly stored banknote is dispensed.

For example, it is assumed that, after necessity of checking the inventory amount of banknotes in the storage unit 60 arose and five banknotes were set as check targets, the depositing process is performed and three banknotes are newly stored in the storage unit 60 before the five banknotes set as check targets are dispensed. In this case, the banknote handling apparatus 1 waits until the newly stored three banknotes are dispensed, and acquires the serial numbers of the five banknotes set as check targets to be dispensed thereafter. Meanwhile, as described above, the banknote handling apparatus 1 performs the dispensing process preferentially from the storage unit 60 in which the banknotes have been newly stored, i.e., in which the banknotes se as check targets are stored.

Thus, the banknote handling apparatus 1, which has acquired the serial numbers of the five banknotes set as check targets while collecting or dispensing the banknotes (step S8; Yes, step S12; Yes), determines whether or not the serial numbers read from the banknotes match the serial numbers recorded in the inventory information stored in the memory 120 (step S13).

In the memory 120, the serial numbers of the banknotes stored in the storage unit 60 are managed in association with the order of the banknotes to be fed out from the storage unit 60. The banknote handling apparatus 1 refers to the memory 120, and identifies five serial numbers recorded in the inventory information so as to correspond to the five banknotes whose serial numbers have been read.

The banknote handling apparatus 1 compares the read serial numbers of the five banknotes fed out from the storage unit 60, with the serial numbers that have been recorded in the inventory information so as to correspond to these five banknotes. When the five serial numbers read from the banknotes match the five serial numbers recorded in the inventory information, the banknote handling apparatus 1 determines that information of all the banknotes stored in the storage unit 60 matches the information recorded in the inventory information stored in the memory 120. That is, the banknote handling apparatus 1 determines that there is no error in the inventory information, of the storage unit 60, stored in the memory 120.

When comparing the serial numbers, the banknote handling apparatus 1 can determine whether there is a match, regardless of the order of the serial numbers. Specifically, even when the order of the serial numbers, of the five banknotes, recorded in the feeding-out order in the inventory information is different from the order of the serial numbers of the five banknotes actually fed out from the storage unit 60, the banknote handling apparatus 1 determines that there is a match, as long as the five serial numbers of the inventory information are in one-to-one correspondence with the five serial numbers read from the banknotes.

When the serial numbers of the five banknotes fed out from the storage unit 60 match the five serial numbers recorded in the inventory information, the banknote handling apparatus 1 determines that there is no abnormality in the inventory amount of banknotes in the storage unit 60 (step S13; No). The banknote handling apparatus 1 notifies the clerk of the obtained result (step S15) to end the inventory checking process. For example, this notification is performed by displaying, on the screen of the operation unit 110, information indicating that there is no abnormality in the inventory amount of banknotes in the storage unit 60.

Meanwhile, when the serial numbers of the five banknotes fed out from the storage unit 60 do not match the five serial numbers recorded in the inventory information, the banknote handling apparatus 1 determines that there is abnormality in the inventory amount of banknotes in the storage unit 60 (step S13; Yes). In this case, the banknote handling apparatus 1 reserves a process of checking all the banknotes in the storage unit 60 (step S14), and thereafter notifies the clerk of the obtained result (step S15) to end the inventory checking process. For example, this notification is performed by displaying, on the screen of the operation unit 110, information indicating that necessity of examining all the banknotes in the storage unit 60 has arisen because the inventory amount of banknotes in the storage unit 60 is abnormal.

The banknotes fed out from the storage unit 60 during the inventory checking process are stored in the collection container 51 or dispensed from the dispensing unit 20. When the banknotes are stored in the collection container 51, the inventory information of the storage unit 60 and the inventory information of the collection container 51 are updated based on the information of the banknotes stored in the collection container 51. When the banknotes are dispensed from the dispensing unit 20, the inventory information of the storage unit 60 is updated based on the information of the dispensed banknotes.

Upon confirming abnormality in the inventory amount through the inventory checking process, the banknote handling apparatus 1 can display, on the operation unit 110, a screen that allows the clerk to select whether to execute the process, reserved in step S14, of examining all the banknotes in the storage unit 60 immediately after the inventory checking process, or to execute the process later. If the clerk selects, by operating the operation unit 110, to immediately execute the reserved process, the banknote handling apparatus 1 starts the process of examining all the banknotes in the storage unit 60.

If the clerk selects, by operating the operation unit 110, to execute the reserved process later, the banknote handling apparatus 1 returns to the state where it can perform normal banknote handling. While performing the banknote handling including the depositing process and the dispensing process, the banknote handling apparatus 1 notifies the clerk, at a predetermined timing, that all the banknotes in the storage unit 60 need to be examined. For example, when the banknote handling has not been performed for a predetermined time period, the banknote handling apparatus 1 notifies the clerk that all the banknotes in the storage unit 60 need to be examined. Alternatively, for example, when the clerk has performed, on the operation unit 110, a predetermined operation for collecting banknotes from the banknote handling apparatus 1 after the business hours of the store, the banknote handling apparatus 1, upon recognizing this operation, notifies the clerk that all the banknotes in the storage unit 60 need to be examined. Upon checking information on the notification displayed on the operation unit 110, the clerk can perform a predetermined operation of instructing start of examination before collecting the banknotes, whereby the banknote handling apparatus 1 starts a process of examining all the banknotes in the storage unit 60.

For example, in the process of examining all the banknotes in the storage unit 60, all the banknotes in the storage unit 60 are discharged to the dispensing unit 20. Thereafter, the clerk inserts, from the depositing unit 10, all the banknotes discharged to the dispensing unit 20. Then, the banknote handling apparatus 1 recognizes and counts these banknotes, reads the serial numbers of the banknotes and stores the banknotes into the corresponding storage unit 60, as described in FIG. 4, and updates the inventory information of the storage unit 60 stored in the memory 120. Thus, the information of the banknotes in the storage unit 60 can be matched with the information of the banknotes recorded in the inventory information.

As described above, the banknote handling apparatus 1 can perform the inventory checking process while feeding out banknotes from the storage unit 60 and collecting the banknotes into the collection unit 50. Meanwhile, the banknote handling apparatus 1 can perform the inventory checking process while feeding out banknotes from the storage unit 60 and dispensing the banknotes to the dispensing unit 20. Therefore, the banknote handling apparatus 1, which does not have a component for temporarily storing banknotes fed out from the storage unit 60, can check presence/absence of abnormality in the inventory amount of banknotes in the storage unit 60. Since the process of returning the banknotes fed out from the storage unit 60 into the storage unit 60 is not required during the inventory checking process, the inventory checking process can be finished in a shorter time than in the conventional art.

The configuration of the banknote handling apparatus 1 according to the present embodiment is merely an example, and is not particularly limited. The banknote handling apparatus 1 may not necessarily have two drums 81, 82 in one storage unit 60. For example, one storage unit 60 may have one drum. For example, the storage unit 60 may not necessarily have a drum, and may be a stacking type storage unit in which banknotes are stacked and stored. The banknote handling apparatus 1 may have a storage/feeding unit capable of storing and feeding out banknotes, in addition to the above described storage unit 60. Even when the banknote handling apparatus 1 has a configuration different from FIG. 2, the banknote handling apparatus 1 can feed out a part of banknotes stored in the storage unit 60, and perform the inventory checking process as described above.

In the present embodiment, the banknote handling apparatus 1 performs a plurality of types of processes. However, the banknote handling apparatus 1 may not necessarily perform all the processes, and may perform some of the processes described above. For example, the banknote handling apparatus 1 may perform either the depositing process or the dispensing process. For example, the banknote handling apparatus 1 may not necessarily perform the process in step S14 shown in FIG. 7.

In the present embodiment, whether the inventory checking process should be performed while collecting banknotes fed out from the storage unit 60 into the collection unit 50 or while dispensing these banknotes to the dispensing unit 20, can be changed through setting. However, implementation of the inventory checking process is not limited thereto. For example, the banknote handling apparatus 1 may perform only the inventory checking process using the collection unit 50, or only the inventory checking process using the dispensing unit 20. Alternatively, for example, the banknote handling apparatus 1 having no collection unit 50 may perform the inventory checking process using the dispensing unit 20, or the banknote handling apparatus 1 having no dispensing unit 20 may perform the inventory checking process using the collection unit 50.

Even when both the inventory checking process using the collection unit 50 and the inventory checking process using the dispensing unit 20 are performed, the clerk may not necessarily set in advance which method (i.e., which unit) should be used. When the inventory checking process becomes necessary, the clerk may select which method should be used for the inventory checking process. Alternatively, the banknote handling apparatus 1 may automatically select the inventory checking process. For example, the banknote handling apparatus 1 may usually perform the inventory checking process using the collection unit 50, and may be automatically switched to the inventory checking process using the dispensing unit 20 when the collection container 51 is almost full of banknotes and cannot store more banknotes set as check targets.

In the present embodiment, the number of banknotes, which are set as check targets to be fed out from the storage unit 60 and checked, is set to five. However, the number of banknotes set as check targets is not particularly limited. For example, the number of banknotes set as check targets may be four or less, or six or more. The number of banknotes set as check targets may differ between the inventory checking process using the collection unit 50 and the inventory checking process using the dispensing unit 20.

When performing the inventory checking process by using the collection unit 50, the number of banknotes set as check targets may be changed according to the number of banknotes storable in the collection container 51. Specifically, for example, although the inventory checking process is usually performed on five banknotes, if the number of banknotes storable in the collection container 51 decreases and becomes equal to or less than a predetermined threshold, the inventory checking process may be performed on two banknotes.

Likewise, when performing the inventory checking process by using the dispensing unit 20, the number of banknotes set as check targets may be changed according to the number of banknotes stored in the storage unit 60. Specifically, for example, although the inventory checking process is usually performed on five banknotes, if the number of banknotes stored in the storage unit 60 decreases and becomes equal to or less than a predetermined threshold, the inventory checking process may be performed on two banknotes. That is, it can be set that the number of banknotes to be set as check targets for the inventory checking process is increased or decreased according to conditions of the apparatus 1.

In the present embodiment, the sheet handling apparatus 1 determines whether or not the serial number of a banknote fed out from the storage unit 60 matches the serial number recorded in the inventory information stored in the memory 120. The criteria for determining that there is a match between serial numbers, can be changed by setting. Specifically, two serial numbers may be determined to match when all the digits thereof match. Alternatively, two serial numbers may be determined to match when some digits thereof match.

In the present embodiment, when necessity of checking banknotes stored in one storage/feeding unit, such as the drum 81$a$ in the storage unit 60$a$, arises, the inventory checking process is performed on this storage/feeding unit. However, when necessity of checking banknotes on the drum 81$a$ arises, the inventory checking process may be performed on the storage unit 60$a$ containing this drum 81$a$, i.e., on each of the drums 81$a$ and 82$a$. When necessity of checking banknotes stored in one storage unit 60 arises, the inventory checking process may be performed on all the storage units 60. For example, when banknotes on one drum 81$a$ needs to be checked, banknotes on all of the drums 81$a$, 81$b$, 82$a$, and 82$b$ may be checked in the inventory checking process.

As described above, when necessity of checking banknotes stored in a storage unit 60 arises, the banknote handling apparatus 1 feeds out only a part of banknotes stored in this storage unit 60 and performs the inventory checking process on the fed-out banknotes to confirm that inventory information stored in the memory 120 has no error. The banknote handling apparatus 1 can collect and store the banknotes, which have been fed out from the storage unit 60 and checked, into the collection container 51 in the collection unit 50 without retuning the banknotes to the storage unit 60. The banknote handling apparatus 1 can also dispense the banknotes, which have been fed out from the storage unit 60 and checked, to the dispensing unit 20. Since the banknotes, which have been fed out from the storage unit 60 and checked, need not be temporally stored in another place and then returned to the original storage unit 60, the banknote handling apparatus 1 can perform the inventory checking process in a shorter time than in the conventional art.

FIG. 8 illustrates a block diagram of a computer that may implement the various embodiments described herein. The present disclosure may be embodied as a system, a method, and/or a computer program product. The computer program product may include a non-transitory computer readable storage medium on which computer readable program instructions are recorded that may cause one or more processors to carry out aspects of the embodiment. For example, control unit 100 and other individual components (including but not limited to operation unit 110 and memory 120) as well as attached components may be configured to include various elements depicted in FIG. 8.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C # or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 8 is a functional block diagram illustrating a networked system 1000 of one or more networked computers and servers. In an embodiment, the hardware and software environment illustrated in FIG. 8 may provide an exemplary platform for implementation of the software and/or methods according to the present disclosure.

Referring to FIG. 8, a networked system 1000 may include, but is not limited to, computer 1005, network 1010, remote computer 1015, web server 1020, cloud storage server 1025 and compute server 1030. In some embodiments, multiple instances of one or more of the functional blocks illustrated in FIG. 8 may be employed.

Additional detail of computer 1005 is shown in FIG. 8. The functional blocks illustrated within computer 1005 are provided only to establish exemplary functionality and are not intended to be exhaustive. And while details are not provided for remote computer 1015, web server 1020, cloud storage server 1025 and compute server 1030, these other computers and devices may include similar functionality to that shown for computer 1005.

Computer 1005 may be a personal computer (PC), a desktop computer, laptop computer, tablet computer, netbook computer, a personal digital assistant (PDA), a smart phone, or any other programmable electronic device capable of communicating with other devices on network 1010.

Computer 1005 may include processor 1035, bus 1037, memory 1040, non-volatile storage 1045, network interface 1050, peripheral interface 1055 and display interface 1065. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 1035 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 1037 may be a proprietary or industry standard high-speed parallel or serial peripheral interconnect bus, such as ISA, PCI, PCI Express (PCI-e), AGP, and the like. Memory 1040 and non-volatile storage 1045 may be computer-readable storage media. Memory 1040 may include any suitable volatile storage devices such as Dynamic Random Access Memory (DRAM) and Static Random Access Memory (SRAM). Non-volatile storage 1045 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 1048 may be a collection of machine readable instructions and/or data that is stored in non-volatile storage 1045 and is used to create, manage and control certain software functions that are discussed in detail elsewhere in the present disclosure and illustrated in the drawings. In some embodiments, memory 1040 may be considerably faster than non-volatile storage 1045. In such embodiments, program 1048 may be transferred from non-volatile storage 1045 to memory 1040 prior to execution by processor 1035.

Computer 1005 may be capable of communicating and interacting with other computers via network 1010 through network interface 1050. Network 1010 may be, for example, a local area network (LAN), a wide area network (WAN) such as the Internet, or a combination of the two, and may include wired, wireless, or fiber optic connections. In general, network 1010 can be any combination of connections and protocols that support communications between two or more computers and related devices.

Peripheral interface 1055 may allow for input and output of data with other devices that may be connected locally with computer 1005. For example, peripheral interface 1055 may provide a connection to external devices 1060. External devices 1060 may include devices such as a keyboard, a mouse, a keypad, a touch screen, and/or other suitable input devices. External devices 1060 may also include portable computer-readable storage media such as, for example, thumb drives, portable optical or magnetic disks, and memory cards. Software and data used to practice embodiments of the present disclosure, for example, program 1048, may be stored on such portable computer-readable storage media. In such embodiments, software may be loaded onto non-volatile storage 1045 or, alternatively, directly into memory 1040 via peripheral interface 1055. Peripheral interface 1055 may use an industry standard connection, such as RS-232 or Universal Serial Bus (USB), to connect with external devices 1060.

Display interface 1065 may connect computer 1005 to display 1070. Display 1070 may be used, in some embodiments, to present a command line or graphical user interface to a user of computer 1005. Display interface 1065 may connect to display 1070 using one or more proprietary or industry standard connections, such as VGA, DVI, DisplayPort and HDMI.

As described above, network interface 1050, provides for communications with other computing and storage systems or devices external to computer 1005. Software programs and data discussed herein may be downloaded from, for example, remote computer 1015, web server 1020, cloud storage server 1025 and compute server 1030 to non-volatile storage 1045 through network interface 1050 and network 1010. Furthermore, the systems and methods described in this disclosure may be executed by one or more computers connected to computer 1005 through network interface 1050 and network 1010. For example, in some embodiments the systems and methods described in this disclosure may be executed by remote computer 1015, computer server 1030, or a combination of the interconnected computers on network 1010.

Data, datasets and/or databases employed in embodiments of the systems and methods described in this disclosure may be stored and or downloaded from remote computer 1015, web server 1020, cloud storage server 1025 and compute server 1030. In an exemplary implementation of the present application, a sheet handling apparatus handles sheets, each of which is assigned identification information capable of identifying each sheet. The apparatus includes: a transport path provided inside the apparatus and configured to transport sheets; a depositing unit configured to receive sheets from the outside of the apparatus, and send the sheets to the transport path; a recognition unit configured to acquire identification information of the sheets transported along the transport path; a storage/feeding unit configured to receive the sheets transported along the transport path and store the sheets therein, and configured to feed out the stored sheets to the transport path; a discharge unit that is used for taking out the sheets, which are fed out from the storage/feeding unit, from the apparatus; a memory configured to store therein identification information of the sheets stored in the storage/feeding unit; and a control unit configured to perform an inventory checking process. In the inventory checking process, the control unit is configured to feed out, from the storage/feeding unit, a part of the sheets that are stored in the storage/feeding unit when necessity of checking an inventory amount of sheets in the storage/feeding unit arises, transport the fed-out sheets through the recognition unit to the discharge unit, and determine abnormality in the inventory amount of the sheets in the storage/feeding unit by comparing the identification information of each of the fed-out sheets with the identification information stored in the memory.

In such a configuration, the discharge unit is a collection unit configured to store, in a collection container, the sheets received from the transport path.

In such a configuration, the collection container is configured to be attached to and detached from the sheet handling apparatus.

In such a configuration, when the sheets set as check targets of the inventory checking process cannot be stored in the collection container, the control unit does not perform the inventory checking process and performs a notification process of notifying that the inventory checking process needs to be performed.

In such a configuration, the discharge unit is a dispensing unit configured to dispense the sheets received from the transport path.

In such a configuration, the control unit acquires the identification information of each of the sheets set as check targets of the inventory checking process during at least one dispensing process in which the sheets set as the check targets are dispensed from the dispensing unit.

In such a configuration, if another sheet is newly stored in the storage/feeding unit before the sheets set as check targets of the inventory checking process are fed from the storage/feeding unit, the control unit waits until the newly stored sheet is fed out from the storage/feeding unit, and thereafter acquires the identification information of each of the sheets set as the check targets fed out from the storage/feeding unit.

In such a configuration, when there are a first storage/feeding unit in which the sheets set as check targets of the inventory checking process are stored and a second storage/feeding unit in which sheets other than the check targets are stored, the control unit performs the dispensing process by using the sheets in the first storage/feeding unit in preference to the sheets in the second storage/feeding unit.

In such a configuration, in the memory, an order of a plurality of pieces of identification information stored in the memory corresponds to an order of the sheets to be fed out from the storage/feeding unit, and the control unit determines that there is no abnormality in the inventory amount of sheets in the storage/feeding unit when the identification information of each of the sheets fed out from the storage/feeding unit is stored in the memory regardless of the order in the memory.

In such a configuration, the control unit compares a part of digits of the identification information of each of the sheets fed out from the storage/feeding unit with the corresponding digits of the identification information stored in the memory to determine whether or not there is a match.

In such a configuration, when the control unit determines that the identification information of the sheet fed out from the storage/feeding unit does not match the identification information stored in the memory, the control unit performs a notification process of notifying that all the sheets in the storage/feeding unit need to be checked.

In such a configuration, the sheet handling apparatus further includes a display unit configured to notify information on the inventory checking process.

In another exemplary implementation of the present application, a sheet handling method that is performed to check an inventory amount of sheets in a storage/feeding unit included in a sheet handling apparatus for handling sheets each of which is assigned identification information capable of identifying each sheet. The method is performed when necessity of the inventory checking process arises. The method includes: setting, as check targets, a part of sheets stored in the storage/feeding unit; feeding out the sheets set as the check targets from the storage/feeding unit; acquiring identification information of each of the sheets set as the check targets; receiving the sheets set as the check targets by a discharge unit used for taking out the sheets from the apparatus; and determining abnormality in an inventory amount of sheets in the storage/feeding unit by comparing the identification information of each of the sheets set as the check targets with identification information stored in a memory.

In such a configuration, when necessity of checking the inventory amount of a storage/feeding unit of the sheet handling apparatus arises, a part of sheets stored in the storage/feeding unit are set as check targets. The sheets set as the check targets, which have been fed out from the storage/feeding unit and checked, are not returned to the original storage/feeding unit but are sent to the discharge unit for discharging sheets from the apparatus. Thus, presence/absence of abnormality in the inventory amount of sheets in the storage/feeding unit can be checked in a short time.

As described above, the sheet handling apparatus and the sheet handling method according to the present disclosure are useful for checking presence/absence of abnormality in the inventory amount of sheets in a storage unit in a short time.

What is claimed is:

1. A sheet handling apparatus for handling sheets, each sheet being assigned identification information capable of identifying the sheet, the sheet handling apparatus comprising:
    a body;
    a transport path for transporting one or more sheets, the transport path provided inside the body;
    a receptacle that receives sheets from an outside of the sheet handling apparatus, and transfers the sheets to the transport path;
    recognition circuitry configured to acquire identification information of the sheets transported along the transport path;
    a storage that receives the sheets transported along the transport path and stores the sheets;
    a feeder that feeds out the sheets stored in the storage to the transport path;
    a discharge port in which the sheets are fed out from the feeder;
    a memory configured to store the identification information of the sheets stored in the storage; and
    control circuitry that performs an inventory checking process, wherein in the inventory checking process, the control circuitry is configured to:
        control the feeder to feed out, from the storage, a part of the sheets that are stored in the storage in a case that necessity of checking an inventory amount of the sheets in the storage arises,
        control transport of the fed-out sheets from the storage to the discharge port via the recognition circuitry, and
        determine an abnormality in the inventory amount of the sheets in the storage by comparing the identification information of each of the fed-out sheets with the identification information stored in the memory,
    wherein the discharge port is a dispenser configured to dispense the sheets received from the transport path,
    the control circuitry is configured to acquire the identification information of each of the sheets set as check targets of the inventory checking process during at least one dispensing process in which the sheets set as the check targets are dispensed from the dispenser, and
    in a case where a depositing process is started after the necessity to perform the inventory checking process of the storage arises and the sheets in the storage are set as the check targets of the inventory checking process, and another sheet is newly stored in the storage before all the sheets set as the check targets of the inventory checking process are fed from the storage, the control circuitry is configured to wait until the newly stored sheet is fed out from the storage after completing the depositing process, and then acquire the identification information of remaining sheets set as the check targets and fed out from the storage.

2. The sheet handling apparatus according to claim 1, wherein in a case that the sheets set as the check targets of the inventory checking process cannot be stored in the collection container, the control circuitry is configured to not perform the inventory checking process and performs a notification process of notifying that the inventory checking process needs to be performed.

3. The sheet handling apparatus according to claim 1, further comprising:
    another storage and another feeder, wherein
    in a case that the storage stores the sheets set as the check targets of the inventory checking process and the another storage stores sheets other than the check targets, the control circuitry is configured to perform the dispensing process by using the sheets in the storage in preference to the sheets in the another storage.

4. The sheet handling apparatus according to claim 1, wherein
    an order of a plurality of pieces of identification information stored in the memory corresponds to an order of the sheets to be fed out from the feeder, and
    the control circuitry determines that there is no abnormality in the inventory amount of sheets in a case that the identification information of each of the sheets fed out from the feeder is stored in the memory regardless of the order in the memory.

5. The sheet handling apparatus according to claim 4, wherein the control circuitry compares a part of digits of the identification information of each of the sheets fed out from the feeder with corresponding digits of the identification information stored in the memory to determine whether or not there is a match.

6. The sheet handling apparatus according to claim 1, wherein in a case that the control circuitry determines that the identification information of the sheet fed out from the feeder does not match the identification information stored in the memory, the control circuitry is configured to perform a notification process of notifying that all the sheets in the storage need to be checked.

7. The sheet handling apparatus according to claim 1, further comprising a display configured to display information relating to the inventory checking process.

8. A sheet handling method, performed to check an inventory amount of sheets in a storage included in a sheet handling apparatus configured to handle sheets each of which is assigned identification information to identifying each sheet, the sheet handling method comprising:
setting, as check targets by control circuitry of the sheet handling apparatus, a part of sheets stored in the storage as check targets;
feeding, by a feeder of the sheet handling apparatus, out the sheets set as check targets from the storage;
acquiring, by the control circuitry identification information of each of the sheets set as the check targets;
feeding out, by the feeder, in a discharge port of the sheet handling apparatus, the sheets set as the check targets in a discharge port of the sheet handling apparatus; and
determining, by the control circuitry, an abnormality in an inventory amount of the sheets in the storage by comparing the identification information of each of the sheets set as the check targets with identification information stored in a memory,
wherein the discharge port is a dispenser configured to dispense the sheets received from a transport path,
the method further comprises acquiring, by the control circuitry, the identification information of each of the sheets set as the check targets during at least one dispensing process in which the sheets set as the check targets are dispensed from the dispenser, and
in a case where a depositing process is started after a necessity to perform an inventory checking process of the storage arises and the sheets in the storage are set as the check targets of the inventory checking process, and another sheet is newly stored in the storage before all the sheets set as the check targets of the inventory checking process are fed from the storage, the identification information of remaining sheets set as the check targets is acquired by the control circuitry after the depositing process is completed and the newly stored sheet is fed out from the storage in another process.

9. A sheet handling apparatus, comprising:
a transport path for transporting sheets, each sheet including individually assigned identification information;
recognition circuitry configured to acquire identification information of each sheet transported along the transport path;
a storage that receives the sheets transported along the transport path and stores the sheets;
a feeder that feeds out the sheets stored in the storage to the transport path; and
control circuitry configured to:
store the identification information of the sheets in a memory;
control the feeder to feed out, from the storage, one or more of the sheets in a case that necessity of checking an inventory amount of the sheets in the storage arises;
control transport of the one or more sheets to the recognition circuitry and discharge out of the one or more sheets by using a collection container or a discharge port; and
determine an abnormality in the inventory amount of the sheets in the storage based on a comparison of the identification information of each of the one or more sheets with the identification information stored in the memory,
wherein the discharge port is a dispenser configured to dispense the sheets received from the transport path,
the control circuitry is configured to acquire the identification information of each of the sheets set as the check targets during at least one dispensing process in which the sheets set as the check targets are dispensed from the dispenser, and
in a case where a depositing process is started after the necessity to perform the inventory checking process of the storage arises and the sheets in the storage are set as the check targets of the inventory checking process, and another sheet is newly stored in the storage before all the sheets set as the check targets of the inventory checking process are fed from the storage, the control circuitry is configured to wait until the newly stored sheet is fed out from the storage after completing the depositing process, and then acquire the identification information of remaining sheets set as the check targets and fed out from the storage.

10. The sheet handling apparatus according to claim 9, wherein the collection container, that is attachable to and detachable from the sheet handling apparatus, collects sheets discharged from the sheet handling apparatus.

11. The sheet handling apparatus according to claim 9, wherein the control circuitry determines that there is no abnormality in the inventory amount of sheets in a case that the identification information of each of the sheets fed out from the feeder is stored in the memory regardless of an order of a plurality of pieces of identification information stored in the memory and an order of the sheets fed out from the feeder.

12. The sheet handling apparatus according to claim 9, wherein in a case that the control circuitry determines that the identification information of the sheet fed out from the feeder does not match the identification information stored in the memory, the control circuitry is configured to perform a notification process of notifying that all the sheets in the storage/feeding unit need to be checked.

13. The sheet handling apparatus according to claim 1, wherein in a case where not all the sheets set as the check targets of the inventory checking process are fed out from the storage during one dispensing process, the sheet handling apparatus returns to a stand-by mode and acquires the identification information of all the sheets set as the check targets by performing a plurality of dispensing processes.

* * * * *